United States Patent
Tsukamoto

(10) Patent No.: US 8,705,098 B2
(45) Date of Patent: Apr. 22, 2014

(54) PREVENTING PRINT DELAY DUE TO TRANSFER OF DATA REGARDING IMAGE FORMING AND TO ENHANCE PRODUCTIVITY IN AN IMAGE FORMING SYSTEM WITH A TANDEM CONFIGURATION INCLUDING A PLURALITY OF IMAGE FORMING APPARATUSES

(75) Inventor: Yasumasa Tsukamoto, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/224,450

(22) Filed: Sep. 2, 2011

(65) Prior Publication Data
US 2012/0057201 A1    Mar. 8, 2012

(30) Foreign Application Priority Data
Sep. 8, 2010   (JP) .................................. 2010-200472

(51) Int. Cl.
G06F 3/12       (2006.01)
G06K 15/00      (2006.01)

(52) U.S. Cl.
USPC ........................................ 358/1.15; 358/1.16

(58) Field of Classification Search
USPC ...................................... 358/1.16, 1.14, 1.15
See application file for complete search history.

(56) References Cited

U.S. PATENT DOCUMENTS

| | | | |
|---|---|---|---|
| 5,548,390 A | 8/1996 | Sugisaki et al. | |
| 8,339,660 B2 | 12/2012 | Kageyama et al. | |
| 2004/0012802 A1* | 1/2004 | Allen et al. | 358/1.13 |
| 2007/0035765 A1* | 2/2007 | Corona | 358/1.15 |

FOREIGN PATENT DOCUMENTS

| | | | |
|---|---|---|---|
| JP | 07-237336 A | 9/1995 | |
| JP | 2001-324839 A | 11/2001 | |
| JP | 2007-008143 A | 1/2007 | |
| JP | 2009-066937 A | 4/2009 | |

OTHER PUBLICATIONS

Derwent English Language Abstract of JP 2009-066937 to Miyamoto et al.*
Japanese Office Action dated Jan. 28, 2014 (and English translation thereof) in counterpart Japanese Application No. 2010-200472.

* cited by examiner

*Primary Examiner* — Eric A Rust
(74) *Attorney, Agent, or Firm* — Holtz, Holtz, Goodman & Chick, PC

(57) ABSTRACT

Disclosed is an image forming system including a series tandem configuration in which a plurality of image forming apparatuses are linked and the plurality of image forming apparatuses each form an image of a different printing face to perform a job, the system including: a storage section which is provided in each of the image forming apparatuses and which stores job data and image data regarding all pages of the job; and a control section which is provided in each of the image forming apparatuses, and which reads out job data and image data of an already performed job from the storage section, and performs control of performing the job again based on the read out job data and image data.

11 Claims, 16 Drawing Sheets

FIG.4A

| ITEM | CONTENT |
|---|---|
| SET NUMBER OF COPIES | NUMBER OF COPIES OUTPUT |
| OUTPUT MODE | ONE FACE/DOUBLE FACE |
| OUTPUT TRAY | PAPER TRAY NUMBER FOR NORMAL PAPER PRINTING |
| APPLICATION FUNCTION | STATE OF SELECTION OF VARIOUS APPLICATION FUNCTIONS FOR EXAMPLE, BINDING MARGIN, REPEATING, CONCENTRATING, ETC. |
| TEST PRINT | INFORMATION WHETHER OR NOT IT IS TEST PRINT MODE |
| COLOR MODE | BLACK AND WHITE/COLOR |
| PAPER TYPE | NORMAL PAPER/CARDBOARD, ETC. |

FIG.4B

| ITEM | CONTENT |
|---|---|
| PAGE NUMBER | OUTPUT PAGE NUMBER |
| IMAGE SIZE, LENGTH AND WIDTH | LENGTH, WIDTH SIZE OF IMAGE |
| DIRECTION OF IMAGE | DIRECTION OF IMAGE (UPWARD, LEFTWARD, DOWNWARD, RIGHTWARD) |
| WIDTH OF IMAGE | IMAGE INFORMATION NUMBER OF ONE PIXEL (TONE NUMBER) |
| ROTATIONAL ANGLE OF IMAGE | ROTATIONAL ANGLE OF IMAGE |
| STORAGE ADDRESS | ADDRESS OF STORAGE DESTINATION OF COMPRESSED IMAGE DATA |

FIG. 8

*(Rotated page showing a printer/copier user interface screen with job ticket editing)*

Top bar: APPARATUS STATUS | JOB LIST | HDD READ OUT | COPY | SCAN — 06/24/2010 15:58

EDITING OF ENTIRE JOB IS PERFORMED BY SELECTING TICKET ITEM ON LEFT SIDE AND
EDITING OF EACH PAGE IS PERFORMED BY SELECTING TICKET ITEM ON RIGHT SIDE

FILE NAME:1111  JOB TICKET EDITING | IMAGE PAGE EDITING

TICKET BY PAGE  SHEET No.1 / 1   ERROR CHECK

JOB TICKET (E11)

APPLICATION SETTING (B11a)

| | |
|---|---|
| STAMP DATE/TIME | OFF |
| COLOR BALANCE | |
| CYAN, HIGH/MEDIUM/LOW | 0/0/0 |
| MAGENTA, HIGH/MEDIUM/LOW | 0/0/0 |
| YELLOW, HIGH/MEDIUM/LOW | 0/0/0 |
| BLACK, HIGH/MEDIUM/LOW | 0/0/0 |
| GLOSS MODE | OFF |

OTHER SETTING (B11b)

| | |
|---|---|
| ERASE FRAME | OFF |
| HIGH ACCURACY IMPOSITION | NORMAL |
| COPY DENSITY | 4 |
| BACKGROUND ADJUSTMENT | 0 |
| PREVENTION OF TRANSFER | 0 |
| TO BACK OF PAPER | |
| COLOR ADJUSTMENT(R/G/B) | 0/0/0 |
| COLOR HUE | 0 |
| COLOR SPECIFYING FINE ADJUSTMENT | 0/0/0 |
| SATURATION | 0 |
| COLOR SPECIFYING FINE ADJUSTMENT | 0/0/0 |
| SHARPNESS | 0 |
| CONTRAST | 0 |
| IMAGE JUDGMENT OF CHARACTER AND PICTURE | 0 |

2/3

TICKET BY PAGE

FRONT / BACK — P 1

PAPER SETTING

| | |
|---|---|
| PROFILE No. | |
| PAPER SIZE | 8K |
| PAPER TRAY | TRAY 1 |
| PAPER TYPE | NORMAL PAPER |
| BASIS WEIGHT | 64–74 g/² |
| COLOR PAPER | WHITE COLOR |
| PUNCH | NO PUNCHED HOLE |

1/1

IMAGE PAGE EDITING (E12)

PRINT FACE

| | |
|---|---|
| PRINT FACE | ONE FACE |

OUTPUT SETTING

| | |
|---|---|
| PAPER DISCHARGE TRAY | MAIN TRAY |
| STAPLE | OFF |
| OVERLAP MIDDLE FOLDING | OFF |
| FOLDING IN THREE | OFF |
| SADDLE STITCHING | OFF |
| SEPARATION BY STAPLING | OFF |
| FOLDING | OFF |
| PUNCH | OFF |

IMAGE QUALITY ADJUSTMENT (B12a)

| | |
|---|---|
| IMAGE SHIFT | OFF |
| IMAGE POSITION | OFF |
| OUTLINE | OFF |
| IMAGE SCREEN | OFF |
| TEXT/GRAPHIC SCREEN | OFF |

OTHER SETTING

| | |
|---|---|
| DOCUMENT SIZE | A4 |
| DOCUMENT TYPE | PORTRAIT |
| DOCUMENT FACE | FRONT |
| MAGNIFICATION RATIO (B12b) | 0.498 |
| RESOLUTION | 600dpi |
| COLOR (B12c) | FULL COLOR |

1/2

Bottom: SAMPLE OUTPUT | CANCEL | NEWLY STORE | OVERWRITE AND STORE

G1

PREVENTING PRINT DELAY DUE TO TRANSFER OF DATA REGARDING IMAGE FORMING AND TO ENHANCE PRODUCTIVITY IN AN IMAGE FORMING SYSTEM WITH A TANDEM CONFIGURATION INCLUDING A PLURALITY OF IMAGE FORMING APPARATUSES

BACKGROUND

1. Field of the Invention

The present invention relates to an image forming system.

2. Description of Related Art

Lately, there is an image forming system with a tandem configuration in which a plurality of image forming apparatuses are linked in a series by connecting a paper conveying path. Such image forming system includes, for example, two image forming apparatuses and a controller which controls the two image forming apparatuses based on data received from an external device. In such image forming system, image forming of each page is divided among the plurality of image forming apparatuses, for example one image forming apparatus forms images of pages with even page numbers and the other image forming apparatus forms images of pages with odd page numbers. However, in such image forming system with a tandem configuration, a plurality of image forming apparatuses are controlled by one controller, and the burden on the controller is large which makes the data transfer time to each image forming apparatus long.

There is a printer system which is disclosed in view of the above (see Japanese Patent Application Laid-Open Publication No. 2009-66937). In the printer system, each printer with the tandem configuration includes a controller. When one controller receives print data transmitted from a host apparatus, the controller simultaneously transmits the print data to the other controller. Then, each controller processes the print data.

However, according to the above technique, transmitting and receiving data and performing processing such as print setting in each controller provided in a plurality of image forming apparatuses means similar processing is performed in each controller, which is not efficient and consumes high cost.

Therefore, it is preferable that a predetermined controller provided in an image forming apparatus receives data regarding image forming and the data is transmitted to other image forming apparatuses. However, when printing is performed with data already received once, for example, when data printed once is printed again, when actual printing is performed after test printing received data, when printing is performed after print setting is performed on the received data, etc., there is a problem that if data is transferred among the image forming apparatuses when printing starts, the timing of starting printing of each image forming apparatus is delayed by the transfer time of data among the image forming apparatuses.

SUMMARY

The present invention has been made in consideration of the above problems, and it is one of main objects to prevent print delay due to transfer of data regarding image forming and to enhance productivity in an image forming system with a tandem configuration including a plurality of image forming apparatuses.

In order to achieve at least one of the above-described objects, according to an aspect of the present invention, there is provided an image forming system including a series tandem configuration in which a plurality of image forming apparatuses are linked and the plurality of image forming apparatuses each form an image of a different printing face to perform a job, the system including:

a storage section which is provided in each of the image forming apparatuses and which stores job data and image data regarding all pages of the job; and a control section which is provided in each of the image forming apparatuses, and which reads out job data and image data of an already performed job from the storage section, and performs control of performing the job again based on the read out job data and image data.

BRIEF DESCRIPTION OF THE DRAWINGS

The present invention will become more fully understood from the detailed description given hereinbelow and the appended drawings, and thus are not intended to define the limits of the present invention, and wherein;

FIG. 4A is a diagram showing an example of job information;

FIG. 4B is a diagram showing an example of page information;

FIG. 8 is a diagram showing an example of a job setting changing screen;

DETAILED DESCRIPTION OF PREFERRED EMBODIMENTS

Below, an embodiment of an image forming system of the present invention is described with reference to the drawings.

[Embodiment 1]

Below, embodiment 1 of the present invention is described in detail with reference to the drawings.

First, the configuration is described.

Figure 1:
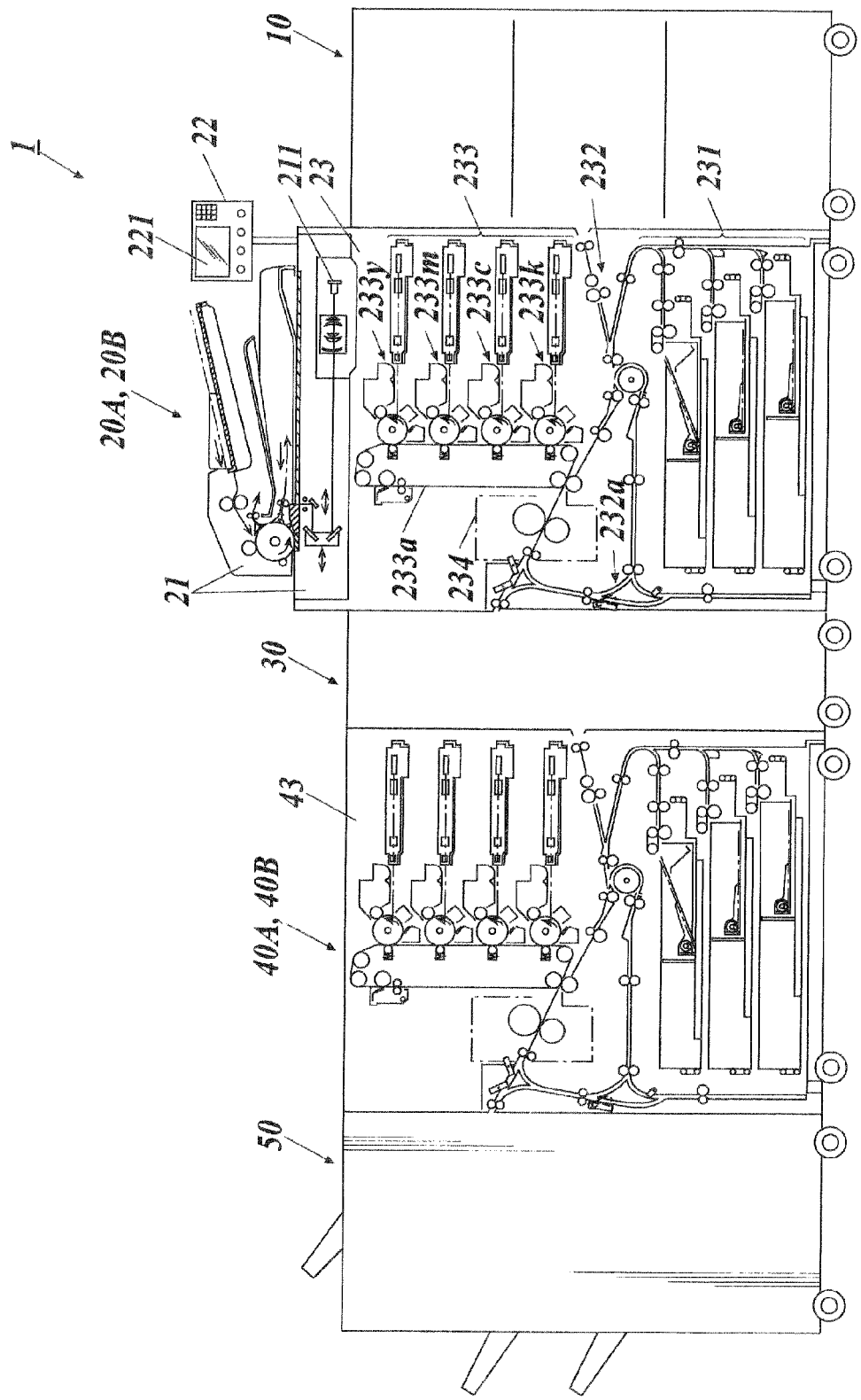
FIG. 1 is a schematic configuration diagram showing an image forming system.

FIG. 1 is a schematic configuration diagram of an image forming system 1 of embodiment 1.

As shown in FIG. 1, the image forming system 1 is a series tandem configuration including, from an upstream side of a paper conveying path, paper feeding device 10, first image forming apparatus 20A, stacking/reversing device 30, second image forming apparatus 40A, post-processing device 50, etc. linked in a series.

In the image forming system of embodiment 1, each of the first image forming apparatus 20A and the second image forming apparatus 40A form an image on different printing faces and perform the job.

The paper feeding device 10 is also called a paper feeding unit (PFU) and includes a plurality of paper feeding trays and a paper feeding means including a paper feeding roller, a dividing roller, paper feeding/dividing rubber, sending roller, etc. Each paper feeding tray stores paper discriminated in advance according to type of paper (paper type, basis weight, paper size, etc.) and the paper feeding means conveys the paper stored in the paper feeding tray one sheet at a time from the top sheet to a paper conveying section of the first image forming apparatus.

The first image forming apparatus 20A reads an image from a document and forms the read image on the paper, and receives print data in a PDL (Page Description Language) format or Tiff format and print setting data in which various output instruction of the print data is set from the external device, etc. and forms an image on the paper based on the received print data and print setting data. The first image forming apparatus 20A includes an image reading section 21, operation/display section 22, print section 23, etc.

The image reading section 21 includes an automatic document feeding section also called an ADF (Auto Document Feeder) and a reading section, and reads an image of a document based on setting information received from the operation/display section 22 to generate image data of the analog signal. The document placed on the document tray of the automatic document feeding section is conveyed to the contact glass which is the reading portion, the image on one face or both faces of the document is read by an optical system and the image of the document is read by the CCD (Charge Coupled Device) 211. Here, an image is not limited to image data such as figures, pictures, etc. but also includes text data such as characters, symbols, etc.

The operation/display section 22 includes a LCD (Liquid Crystal Display) 221, a touch panel provided so as to cover the LCD 221, various switches, buttons, numeric keys, operation key group, etc. The operation/display section 22 receives an instruction from a user and outputs the operation signal to the control section 250A. The operation/display section 22 also displays various setting screens to input various operation instructions and setting information and various processing results, etc. according to a display signal input from the control section 250A.

The print section 23 performs image forming processing by an electro-photographic method and includes sections regarding print output such as a paper feeding section 231, paper conveying section 232, image forming sections 233 of each color, fixing unit 234, etc.

The print section 23 of the present embodiment is described with an example employing an electro-photographic method, however the method is not limited to this and other print methods can be employed such as ink-jet method, heat sublimation method, etc.

The paper feeding section 231 includes a plurality of paper feeding trays and a paper feeding means including a paper feeding roller, dividing roller, paper feeding/dividing rubber, sending roller, etc. provided for each paper feeding tray. Each paper feeding tray stores paper discriminated in advance according to type of paper (paper type, basis weight, paper size, etc.) and the paper feeding means conveys the paper stored in the paper feeding tray one sheet at a time from the top sheet to a paper conveying section.

The paper conveying section 232 conveys paper conveyed from a paper feeding device 10 or paper feeding section 231 to a paper conveying path to the image forming section 233 which passes through a plurality of intermediate rollers, resist rollers, etc. and conveys the paper to a transfer device of the image forming section 233.

The paper conveying section 232 includes a reverse conveying section 232a. The reverse conveying section 232a reverses the front and back of the paper discharged from the fixing unit 234 by switchback with a reversing roller, etc. and conveys the paper to the stacking/reversing device 30 or the secondary transfer position.

The image forming section 233 includes a photoreceptor drum, a charging device, an exposing device, a developing device, a primary transfer roller, a cleaning device, etc., and generates output where the image is formed on the paper based on the print image data. When the first image forming apparatus 20A forms a color image, the image forming section 233 is provided for each color. In the image forming section 233y which forms an image of a color yellow (Y), light according to the print image data of yellow (Y) is emitted from the exposing device and an electrostatic latent image is written on the surface of the photoreceptor drum charged with the charging device. Then, charged yellow (Y) toner is applied to the surface of the photoreceptor drum written with the electrostatic latent image and the electrostatic latent image is developed with the developing device. The toner applied on the photoreceptor drum with the developing device is transferred to the intermediate transfer belt 233a at the primary transfer position where the primary transfer roller is positioned by rotating the photoreceptor drum at a certain speed. After the toner is transferred to the intermediate transfer belt 233a, the cleaning device removes the residual charge, the residual toner, etc. on the surface of the photoreceptor drum and the removed toner, etc. is collected in the toner collecting box.

Similarly, the image forming sections 233m, 233c, and 233k which form images of each color of magenta (M), cyan (C) and black (K) include a charging device, an exposing device, a developing device, a primary transfer roller, a cleaning device, etc. provided surrounding the photoreceptor drum and each image forming section forms a toner image of magenta (M), cyan (C) and black (K).

The toner images of each color transferred to the intermediate transfer belt 233a are transferred collectively to the paper at the secondary transfer position where the secondary transfer roller is positioned.

The fixing unit 234 includes a fixing heater, a fixing roller, a fixing external heating section, etc. and heat fixes the toner image transferred onto the paper.

The paper on which fixing processing is performed by the fixing unit 234 is conveyed to the stacking/reversing device 30 with the paper discharging roller, etc. or reversed by the reverse conveying section 232a of the paper conveying section 232 and conveyed again to the secondary transfer position.

The stacking/reversing device 30 is provided between the first image forming apparatus 20A and the second image forming apparatus 40A, and coveys the paper from the first image forming apparatus 20A to the second image forming apparatus 40A according to an instruction from the first image forming apparatus. The stacking/reversing device 30 includes a paper reversing section including a reversing roller, etc. and a stacking section which stacks a plurality of sheets of paper. When the front and back of the paper conveyed to the second image forming apparatus 40A needs to be reversed, the front and back of the paper conveyed from the image forming apparatus 20A is reversed by switchback by the paper reversing section and conveyed to the second image forming apparatus 40A. When the operation of the second image forming apparatus 40A is stopped temporarily due to correction, etc., the paper conveyed from the first image forming apparatus 20A is stored temporarily in the stacking section and the paper is conveyed to the second image forming apparatus 40A at the timing when the operation of the second image forming apparatus 40A is resumed. In other words, the stacking/reversing section 30 includes a stacking function which adjusts the timing between the first image forming apparatus 20A and the second image forming apparatus 40A. When a jam occurs in the second image forming apparatus 40A, the stacking section functions as a paper discharging tray for discharging paper on which image is formed or already fed in the first image forming apparatus 20A.

When the paper reversing section in the first image forming apparatus 20A performs the reversing of the paper conveyed from the first image forming apparatus 20A to the second image forming apparatus 40A, the stacking/reversing device 30 does not have to be provided in the image forming system 1.

The second image forming apparatus 40A includes a print section 43, etc. and forms an image on a paper according to an instruction from the first image forming apparatus 20A.

The print section 43 included in the second image forming apparatus 40A has a similar configuration to that of the print section 23 included in the first image forming apparatus 20A, and therefore the description is omitted.

The post-processing device 50 includes various post-processing units such as a reversing unit, a sorting unit, a stapling unit, a punching unit, a folding unit, a book unit, etc., a paper discharging tray, and the like, and according to an instruction from the first image forming apparatus 20A, performs various post-processing on the paper conveyed from the second image forming apparatus 40A and discharges the paper on which post-processing is performed to the paper discharging tray.

Figure 2:
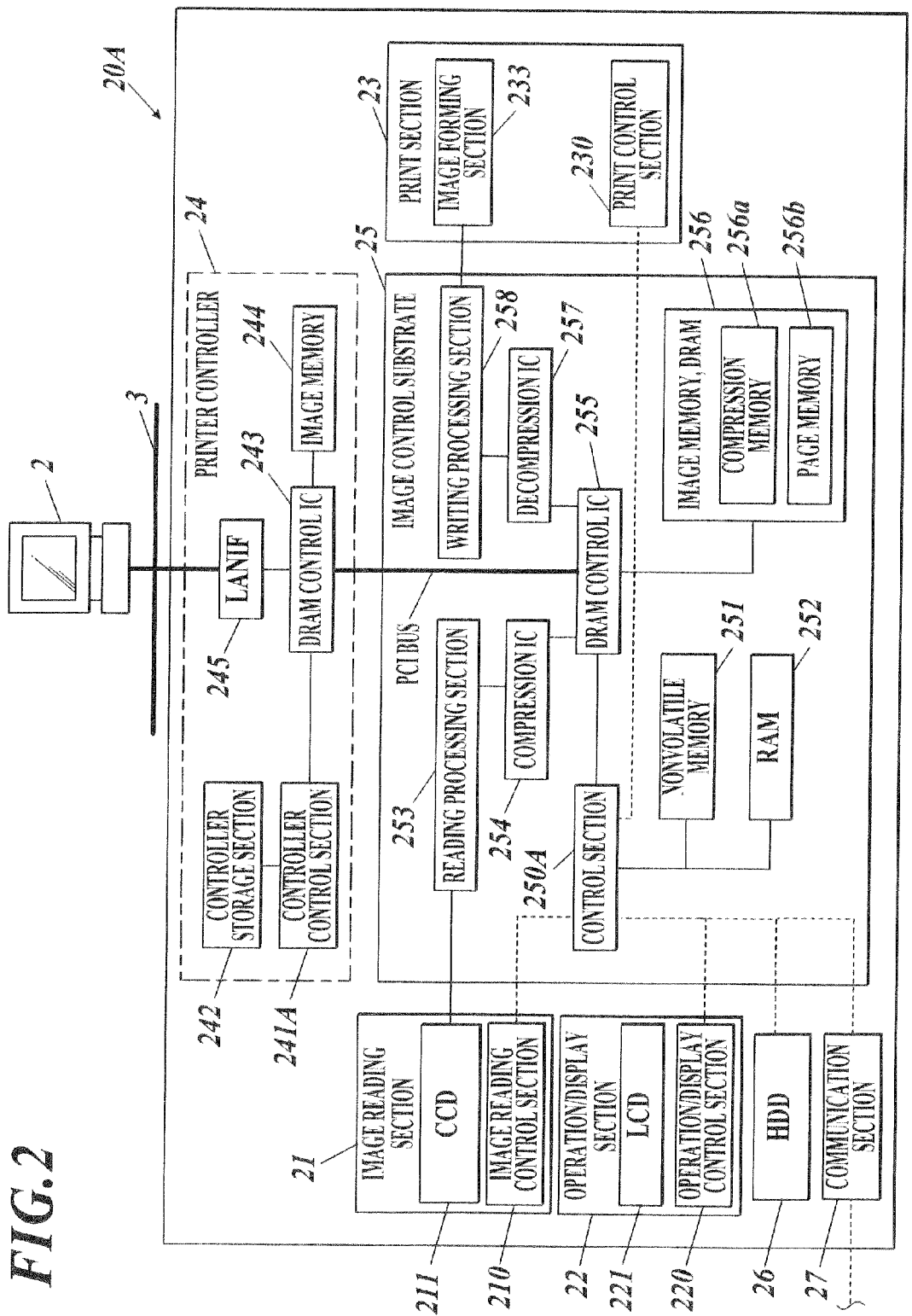
FIG. 2 is a schematic configuration diagram showing a first image forming apparatus of embodiment 1.

FIG. 2 is a schematic configuration diagram of the first image forming apparatus 20A of embodiment 1.

As shown in FIG. 2, the first image forming apparatus 20A includes an image reading section 21, an operation/display section 22, a print section 23, a controller 24, an image control substrate 25, a HDD (Hard Disk Drive) 26, a communication section 27, etc. The first image forming apparatus 20A is connected to an external device 2 on a network 3 through a LANIF (Local Area Network InterFace) 245 of the controller 24 so that data can be transmitted and received between each other.

The image reading section 21 includes the above described automatic document feeding section and the reading section, and an image reading control section 210. The image reading control section 210 controls the automatic document feeding section and the reading section according to an instruction from the control section 250A to realize a scanning function which reads images of a plurality of documents. Image data of an analog signal read with the image reading section 21 is output to a reading processing section 253 and the data is converted with A/D conversion with the reading processing section 253 and various image processing is performed.

The operation/display section 22 includes the above described LCD 221, touch panel, etc. and an operation/display control section 220. The operation/display control section 220 displays various screens to input various setting conditions, various processing results, etc. according to a display signal input from the control section 250A on the LCD. The operation/display control section 220 outputs an operation signal input from various switches, buttons, numeric keys, operation key group, touch panel, etc. to the control section 250A.

The print section 23 includes the above described sections regarding print output such as the paper feeding section 231, the paper conveying section 232, the image forming sections 233 of each color, fixing unit 234, etc. and the print control section 230. The print control section 230 controls operation of each section of the print section 23 of each image forming section 233, etc. of each color according to an instruction from the control section 250A and performs image forming based on print image data input from the writing processing section 258.

The controller 24 performs management and control of data input to the image forming system 1 from an external device 2, etc. connected to a network 3, receives data (print data and print setting data) of a print target from the external device 2, and transmits the image data generated by expanding the print data and the print setting data to the image control substrate 25.

The controller 24 includes a controller control section 241A, a controller storage section 242, a DRAM (Dynamic Random Access Memory) control IC 243, an image memory 244, a LANIF 245, and the like.

The controller control section 241A centrally controls the operation of each section of the controller 24 in order to store print data and print setting data input from the external device 2 through the LANIF 245 to the controller storage section 242 included in its apparatus and to expand the print data to generate image data in a bit map format.

The controller storage section 242 includes a nonvolatile memory and stores print data and print setting data.

The DRAM control IC 243 controls transfer of print data received by the LANIF 245 to the controller control section 241A and writing/reading of image data and print setting data to/from the image memory 244. The DRAM control IC 243 is connected to the DRAM control IC 255 of the image control substrate 25 by a PCI (Peripheral Components Interconnect) bus and reads out the image data of the print target and the print setting data from the image memory 244 and outputs the data to the DRAM control IC 255 according to an instruction from the controller control section 241A.

The image memory 244 is composed of a volatile memory such as a DRAM, etc. and temporarily stores the received print data and the print setting data, and the generated image data.

The LANIF 245 is a communication interface to connect with the network 3 such as a LAN, etc. including a NIC (Network Interface Card), modem, etc. and functions as a receiving section to receive print data and print setting data from the external device 2. The received print data and the print setting data is output to the DRAM control IC 243.

The image control substrate 25 includes a control section 250A, a nonvolatile memory 251, a RAM (Random Access Memory) 252, a reading processing section 253, a compression IC 254, a DRAM control IC 255, an image memory 256, a decompression IC 257, a writing processing section 258 and the like.

The control section 250A includes a CPU (Central Processing Unit), etc. The control section 250A reads out a specified program from a system program and various application programs stored in the non-volatile memory 251 and expands the program in the RAM 252. In coordination with the program expanded in the RAM 252, the control section 250A performs various processing and centrally controls each section of the first image forming apparatus 20A.

The control section 250A performs first print processing, print setting changing processing, reprint processing, overlay image registering processing and backup processing with the second image forming apparatus 40A in coordination with a first print processing program, a print setting changing processing program, a reprint processing program, an overlay image registering program and a backup processing program and various pieces of data of the embodiment 1 in the nonvolatile memory 251.

In the first print processing, job data and compressed image data are generated based on image data and print setting data input through the controller 24 from the external device 2 or image data input from the image reading section 21 and setting information set on the operation/display section 22, and the job data and the compressed image data are transmitted to the second image forming apparatus. The job is performed in coordination with the second image forming apparatus 40A based on the job data and the compressed image data.

A job is a sequence of operations regarding the image forming, for example, when a copy is formed from a document of a predetermined number of pages, a sequence of operations regarding forming an image of the document of the predetermined number of pages is one job. The data to perform the operation of the job is job data.

Job data includes job information and page information.

Figure 3:
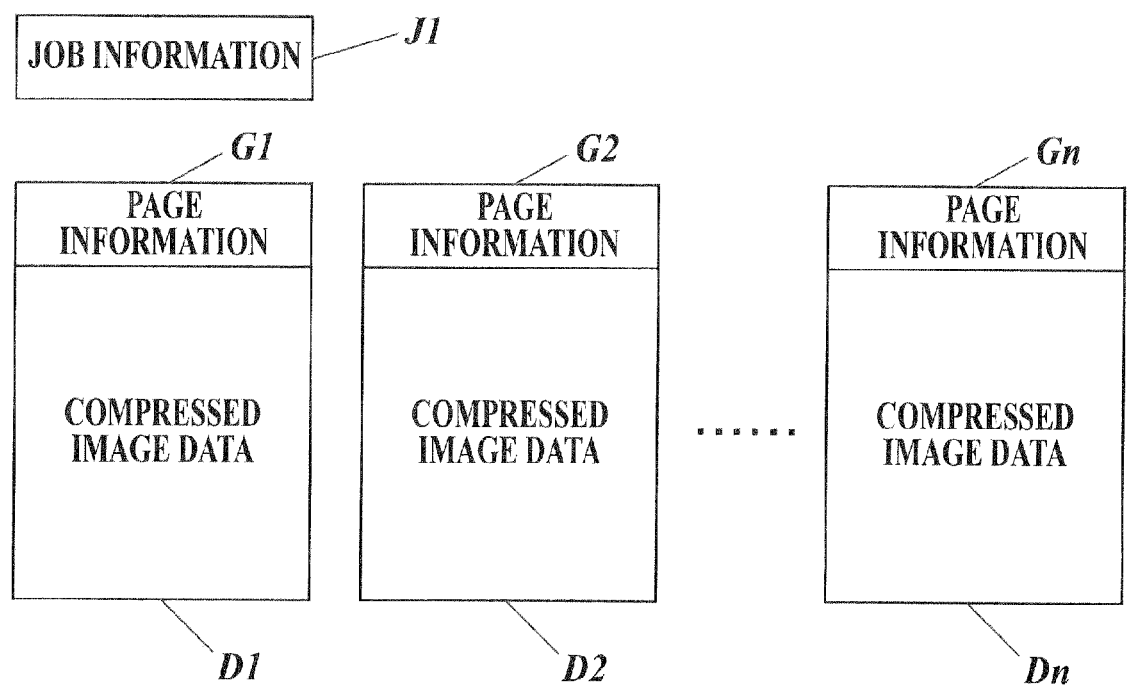
FIG. 3 is a diagram showing a configuration example of job data.

FIG. 3 shows an example of a configuration of job data, FIG. 4A shows an example of job information and FIG. 4B shows an example of page information.

Job information is information common to all pages. For example, as shown in FIG. 4A, job information includes set number of copies, output mode, output tray, application function, whether or not test print is performed, color mode, paper type, etc. of the job.

As shown in FIG. 3, page information is corresponded with compressed image data D1 to Dn of each page and the page information is information regarding the compressed image data to which the page information is corresponded to. For example, as shown in FIG. 4B, the page information includes page number, image size (length, width), direction of image, width of image, rotational angle of image, storage address, etc.

The print setting changing processing is a processing performed after the first print processing. In the print setting changing processing, when the change instruction data to change the job is input from the controller 24 or the operation/display section 22, it is judged whether or not it is necessary to regenerate image data with the change instruction data and according to the judgment result, the change instruction data, or the job data regenerated based on the change instruction data and image data are transmitted from the first image forming apparatus to the second image forming apparatus. Then, the job is performed again in coordination with the second image forming apparatus 40A based on the changed job data and the compressed image data.

The reprint processing is a processing performed after the first print processing. In the reprint processing, the job data of a specified stored job and the compressed image data are read out from the HDD 26 and the job is performed again in coordination with the second image forming apparatus based on the read job data and the compressed image data.

A stored job is a job in which a storage instruction to store in the HDD is set.

In the overlay image registering processing, the image data input from the image reading section 21 is stored and registered as overlay image data in the HDD 26 and the image data is transmitted to the second image forming apparatus. The overlay image registering processing is also called the registration overlay mode.

Overlay is a function to form an image by overlapping overlay image data registered in advance to the image data of the job.

In the backup processing, when trouble occurs in the HDD 26 of its apparatus, all of the data stored in the HDD 26 is rewritten as all of the data stored in the HDD of another image forming apparatus (HDD 46 of the second image forming apparatus).

In addition to various processing programs regarding image forming and various pieces of data, the nonvolatile memory 251 stores a first print processing program, print setting changing processing program, reprint processing program, overlay image registering processing program, backup processing program, data processed in the various programs, and the like regarding embodiment 1.

The RAM 252 forms a work area which temporarily stores various programs performed by the control section 250A and various pieces of data regarding the programs.

The RAM 252 temporarily stores job data generated by the control section 250A according to image data and print setting data input from the controller 24 or image data input from the image reading section 21 and setting information set on the operation/display section 22 when the image data is obtained.

The reading processing section 253 performs various processing such as analog processing, A/D conversion processing, shading processing, etc. on image data of an analog signal input from the image reading section 21 and then generates image data of a digital signal. The generated image data is output to the compression IC 254.

The compression IC 254 performs compression processing on the image data of the input digital signal and outputs the data to the DRAM control IC 255.

The DRAM control IC 255 controls compression processing of the image data by the compression IC 254 and decompression processing of the compressed image data by the decompression IC 257 and also performs input and output control of image data from and to the image memory 256 according to an instruction from the control section 250A.

For example, when a storage instruction of image data read by the image reading section 21 is input from the control section 250A, the DRAM control IC 255 allows the compression IC 254 to perform compression processing of the image data input to the reading processing section 253 and stores the compressed image data in a compression memory 256a of the image memory 256. When the image data is input from the DRAM control IC 243 of the controller 24, the DRAM control IC 255 allows the compression IC 254 to perform the compression processing of the image data and stores the compressed image data in the compression memory 256a of the image memory 256.

When the print output instruction of the compressed image data stored in the compression memory 256a is input from the control section 250A, the DRAM control IC 255 reads out the compressed image data from the compression memory 256a, allows the decompression IC 257 to perform the decompression processing and stores the data in the page memory 256b. When the print output instruction of the image data stored in the page memory 256b is input, the DRAM control IC 255 reads out the image data from the page memory 256b and outputs the data to the writing processing section 258.

The image memory 256 includes the compression memory 256a composed of the DRAM (Dynamic RAM) and the page memory 256b. The compression memory 256a is a memory which stores compressed image data and the page memory 256b is a memory which temporarily stores image data for print output or a memory which temporarily stores data received from the controller before compression.

The decompression IC 257 performs decompression processing on the compressed image data.

The writing processing section 258 generates print image data for image forming and outputs the data to the print section 23 based on image data input from the DRAM control IC 255.

The HDD 26 stores job data and compressed image data. The job of the job data and the compressed image data stored in the HDD 26 is called the stored job.

According to embodiment 1, an HDD is used as the storage medium to store the job data and the compressed image data of the stored job, however, it is not limited to this and can be any rewritable nonvolatile memory.

The RAM 252 which stores the job data, compression memory 256a which stores the compressed image data, the HDD 26 which stores the job data and the compressed image data function as the storage section.

The communication section 27 is a communication interface to connect with the network to which each apparatus composing the image forming system 1 is connected and transmits and receives various pieces of data to and from each apparatus.

Figure 5:
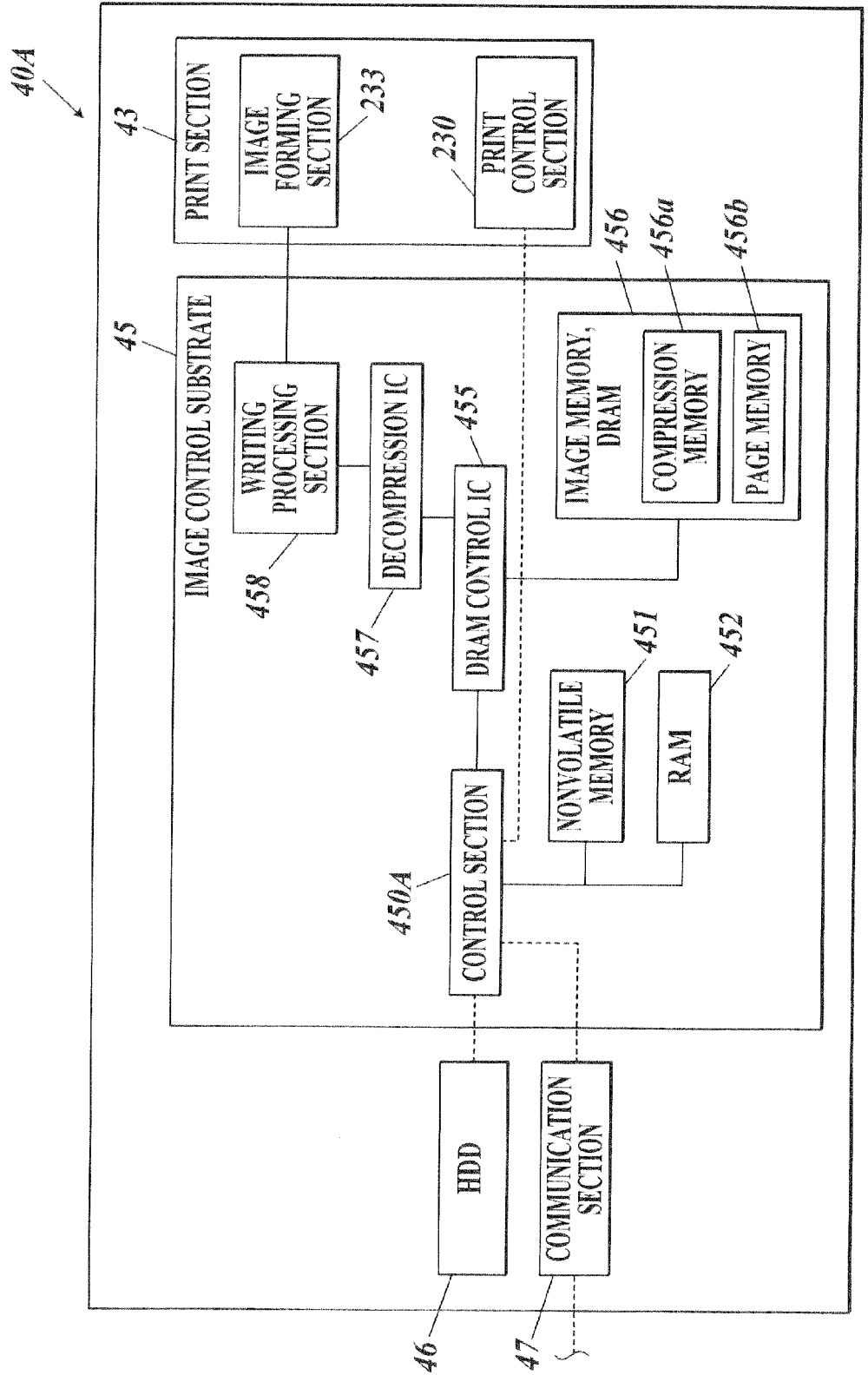
FIG. 5 is a schematic configuration diagram showing a second image forming apparatus of embodiment 1.

FIG. 5 shows a schematic configuration diagram of a second image forming apparatus 40A in embodiment 1.

As shown in FIG. 5, the second image forming apparatus 40A includes a print section 43, an image control substrate 45, an HDD 46, a communication section 47 and the like.

The print section 43 is similar to the print section 23 of the first image forming apparatus 20A, and therefore the same reference numerals are applied to the same portions, and the description is omitted.

The image control substrate 45 includes a control section 450A, a nonvolatile memory 451, a RAM 452, a DRAM control IC 455, an image memory 456, a decompression IC 457, a writing processing section 458 and the like.

The control section 450A includes a CPU (Central Processing Unit), etc. The control section 450A reads out a specified program from a system program and various application programs stored in the non-volatile memory 451 and expands the program in the RAM 452. In coordination with the program expanded in the RAM 452, the control section 450A performs various processing and centrally controls each section of the second image forming apparatus 40A.

The control section 450A performs first print processing, print setting changing processing, reprint processing, overlay image registering processing and backup processing with the first image forming apparatus 20A according to a control signal from the first image forming apparatus 20A, in coordination with a first print processing program, a print setting changing processing program, a reprint processing program, an overlay image registering processing program and a backup processing program and various pieces of data of the embodiment 1 in the nonvolatile memory 451.

In the first print processing, the job is performed in coordination with the first image forming apparatus based on the job data and the image data received from the first image forming apparatus.

In the print setting changing processing, when the change instruction data is received from the first image forming apparatus 20A, the stored job data is changed and rewritten based on the change instruction data and when job data and image data are received, the stored job data and image data are rewritten to the received job data and image data. Then, the job is performed again in coordination with the first image forming apparatus 20A based on the changed job data and the compressed image data.

In the reprint processing, when specified information of a job is received from the first image forming apparatus 20A, the job data and the image data of the stored job corresponding to the specified information are read out from the HDD 46 and the job is performed again in coordination with the first image forming apparatus 20A based on the read out job data and image data.

In the overlay image registering processing, when the overlay image data is received from the first image forming apparatus 20A, the overlay image data is stored and registered in the HDD 46.

In the backup processing, when there is trouble in the HDD 46 of its apparatus, all of the data stored in the HDD 46 is rewritten as all of the data stored in the HDD of another image forming apparatus (HDD 26 of the first image forming apparatus).

In addition to various processing programs regarding image forming and various pieces of data, the nonvolatile memory 451 stores a first print processing program, print setting changing processing program, reprint processing program, overlay image registering processing program, backup processing program, data processed in the various programs, and the like regarding embodiment 1.

The RAM 452 forms a work area which temporarily stores various programs performed by the control section 450A and various pieces of data regarding the programs.

The RAM 452 temporarily stores job data input from the first image forming apparatus 20A through the communication section 47.

The DRAM control IC 455 controls decompression processing of the compressed image data by the decompression IC 457 and also performs input and output control of image data from and to the image memory 456 according to an instruction from the control section 450A.

For example, when job data and compressed image data is input from the communication section 47, the DRAM control IC 455 stores the job data in the RAM 452 and the compressed image data in the compression memory 456a of the image memory 456.

When the print output instruction of the compressed image data stored in the compression memory 456a is input from the control section 450A, the DRAM control IC 455 reads out the compressed image data from the compression memory 456a, allows the decompression IC 457 to perform the decompression processing and stores the data in the page memory 456b. When the print output instruction of the image data stored in the page memory 456b is input, the DRAM control IC 455 reads out the image data from the page memory 456b and outputs the data to the writing processing section 458.

The image memory 456 includes the compression memory 456a composed of the DRAM (Dynamic RAM) and the page memory 456b. The compression memory 456a is a memory which stores compressed image data and the page memory 456b is a memory which temporarily stores image data for print output.

The decompression IC 457 performs decompression processing on the compressed image data.

The writing processing section 458 generates print image data for image forming and outputs the data to the print section 43 based on image data input from the DRAM control IC 455.

The HDD 46 stores job data and compressed image data of the stored job received through the communication section 47.

According to embodiment 1, an HDD is used as the storage medium to store the job data and the compressed image data of the stored job, however, it is not limited to this and can be any rewritable nonvolatile memory.

The RAM 452 which stores the job data, compression memory 456a which stores the compressed image data, the HDD 46 which stores the job data and the compressed image data function as the storage section.

The communication section 47 is a communication interface to connect with the network to which each apparatus composing the image forming system 1 is connected and transmits and receives various pieces of data to and from each apparatus.

Next, the operation of embodiment 1 is described.

Figure 6:
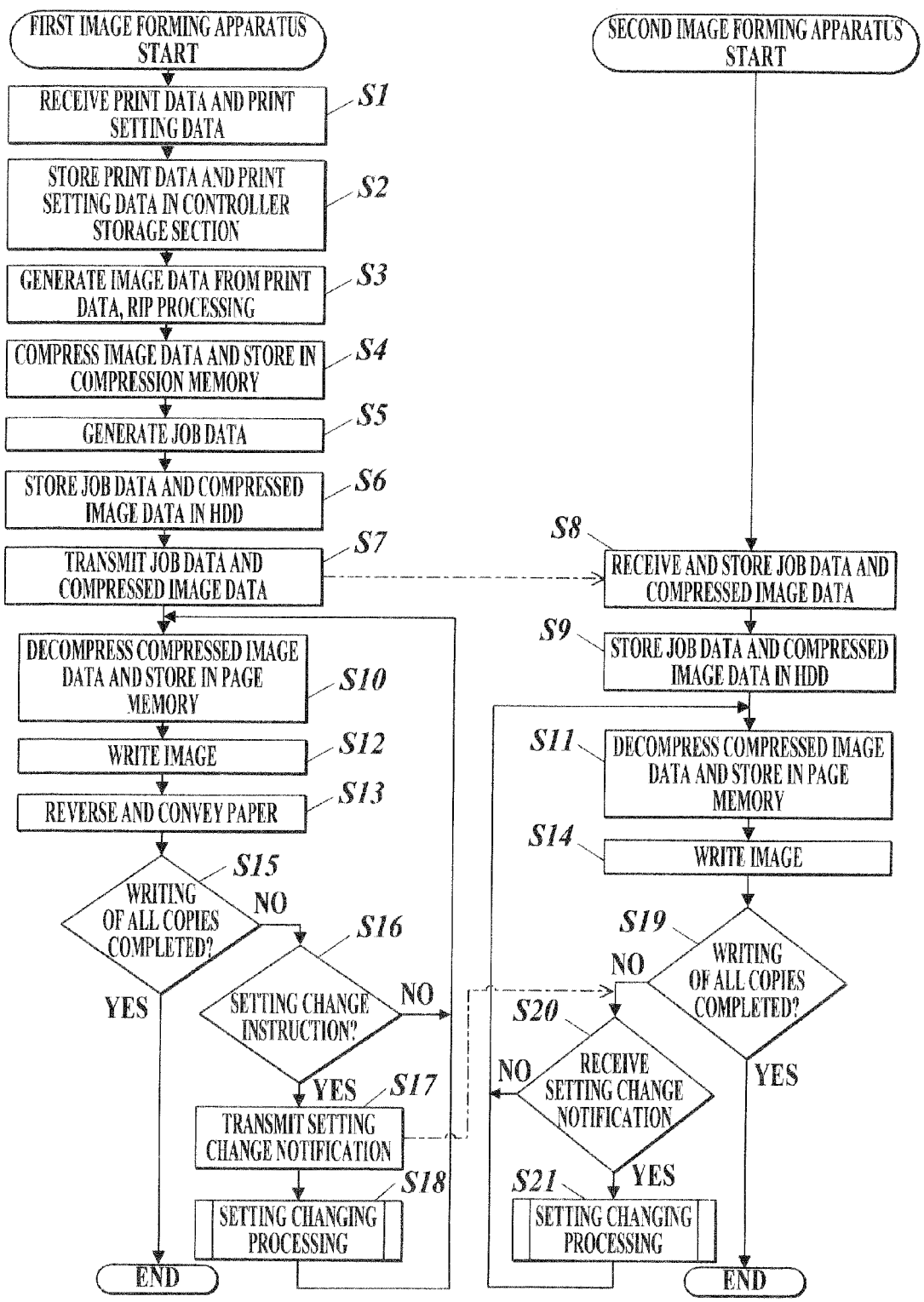
FIG. 6 is a flowchart of a first print processing and print setting changing processing in embodiment 1.
Figure 7:
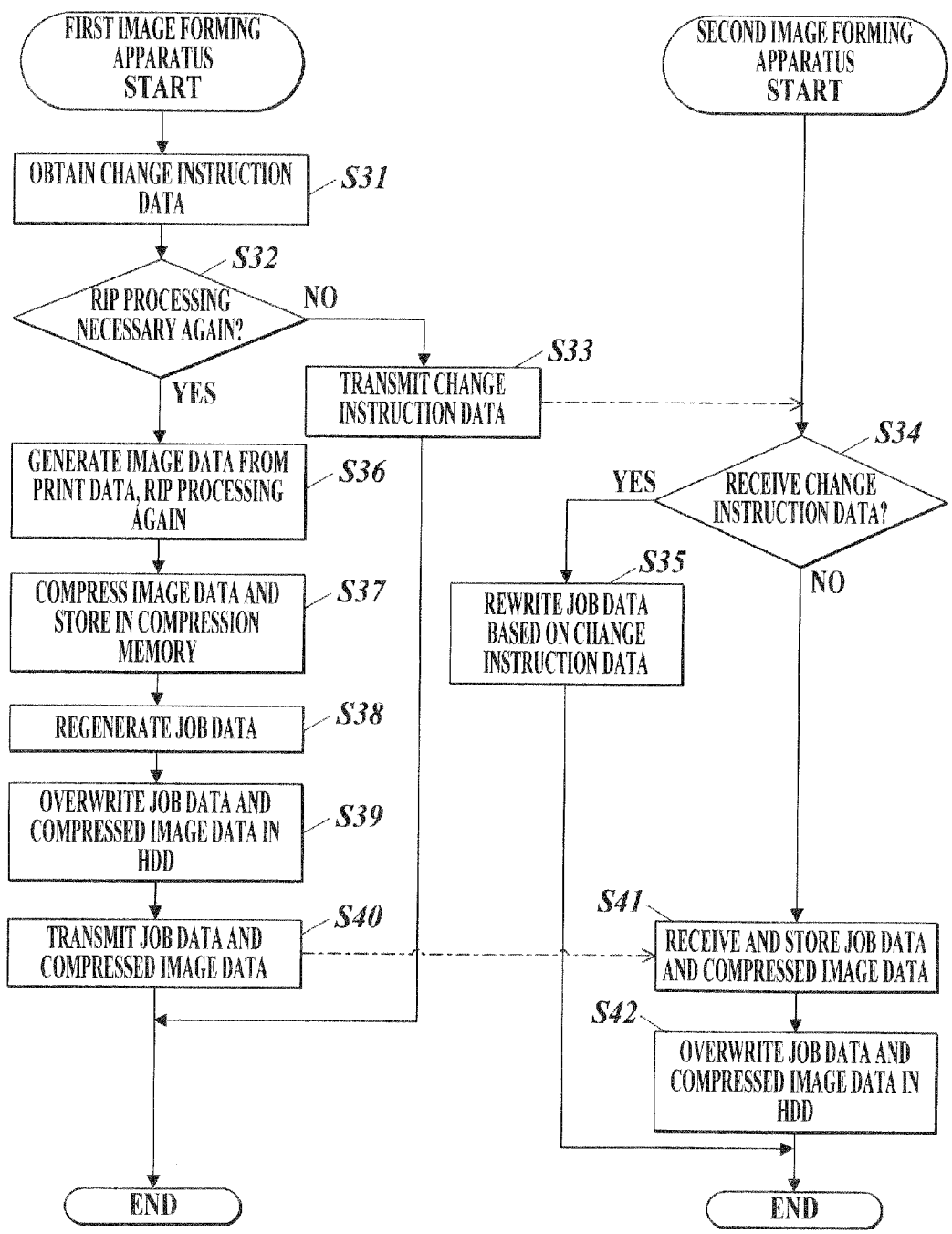
FIG. 7 is a flowchart of setting changing processing performed in step S18 and S21.

FIG. 6 and FIG. 7 show a flowchart of the first print processing and the print setting changing processing of embodiment 1.

The controller control section 241A of the first image forming apparatus receives print data and print setting data from the external device 2 connected through the network 3 with the LANIF 245 (step S1).

The controller control section 241A stores the received print data and the print setting data in the controller storage section 242 (step S2) and expands the print data and performs RIP (Raster Image Processor) processing to generate image data (step S3). Then, the controller control section 241A transmits the image data and the print setting data to the control section 250A through the DRAM control IC 255 of the first image forming apparatus by using the DRAM control IC 243.

When the image data of the analog signal is obtained by the image reading section 21, instead of the processing of steps S1 to S3, different processing is performed which is to input image data generated from the image data of the analog signal by the reading processing section 253 and setting information set on the operation/display section 22 when the image data of the analog signal is obtained to the control section 250A. In this case, the image data generated from the image data of the analog signal corresponds to the image data generated from the print data and the setting information corresponds to the print setting data.

The processing when image data and setting information are input to the control section 250A from the image reading section and the operation/display section is similar to the processing when image data and print setting data are input from the controller to the control section 250A (processing from step S4 and after), therefore the example of when the image data and the print setting data are input from the controller to the control section 250A is described below.

When the image data and the print setting data are received from the controller 24, the control section 250A of the first image forming apparatus allows the compression IC 254 to perform compression processing on all of the received image data and generates compressed image data. Then, the control section 250A stores the generated compressed image data to the compression memory 256a (step S4).

The control section 250A of the first image forming apparatus generates job data regarding all pages of the job based on the print setting data and the compressed image data and the generated job data is stored in the RAM 252 (step S5).

When the job including the job data and the compressed image data is the stored job, the control section 250A of the first image forming apparatus stores the job data regarding all pages of the stored job and the compressed image data in the HDD 26 (step S6).

Then, the control section 250A of the first image forming apparatus transmits the job data regarding all pages of the job and the compressed image data to the second image forming apparatus through the communication section 27 (step S7).

When the job data and the compressed image data are received through the communication section 47 (step S8), the control section 450A of the second image forming apparatus stores the job data in the RAM 452 and the compressed image data in the compression memory 456a.

When the job including the job data and the compressed image data is the stored job, the control section 450A of the second image forming apparatus stores the job data and the compressed image data in the HDD 46 (step S9).

The control section 250A of the first image forming apparatus refers to the image list formed based on the job data, reads out the compressed image data of the page (for example, odd-numbered page) of the print face to be printed with its apparatus (first image forming apparatus) from the compression memory 256a and performs decompression processing with the decompression IC 257 to store the data in the page memory 256b (step S10).

Similar to the control section 250A of the first image forming apparatus, the control section 450A of the second image forming apparatus refers to the image list formed based on the job data, reads out the compressed image data of the page (for example, even-numbered page) of the print face to be printed with its apparatus (second image forming apparatus) from the compression memory 456a and performs decompression processing with the decompression IC 457 to store the data in the page memory 456b (step S11).

In step S10, when the overlay is set in the job data, the control section 250A of the first image forming apparatus reads out the compressed image data corresponding to the overlay image data set in the job data from the HDD 26, and allows the decompression IC 257 to perform decompression processing. Then, the decompressed image data of the page to be printed is combined with the overlay image data and the combined data is stored in the page memory 256b. Similar to step S10, in step S11, when the overlay is set in the job data, the control section 450A of the second image forming apparatus reads out the compressed image data corresponding to the overlay image data set in the job data from the HDD 46 and allows the decompression IC 457 to perform decompression processing. Then, the decompressed image data of the page to be printed is combined with the overlay image data and the combined data is stored in the page memory 456b.

When the job is a double face print mode, the control section 250A of the first image forming apparatus outputs the image data stored in the page memory 256b to the writing processing section 258, outputs the print image data generated by the writing processing section 258 to the print section 23 and writes and forms an image on one face (front face) of the paper (step S12).

Then, according to an instruction from the control section 250A, the paper on which an image is formed on a front face of the paper is reversed front and back by the reverse conveying section 232a of the print section 23 or the stacking/reversing device 30 and the paper is conveyed to the second image forming apparatus (step S13).

A double face mode is a mode in which images are formed on both faces of the paper.

When the paper on which the image is formed on one face and reversed is conveyed from the first image forming apparatus, the control section 450A of the second image forming apparatus outputs image data stored in the page memory 456b to the writing processing section 458 and outputs print image data generated by the writing processing section 458 to the print section 43 and writes and forms the image on the other face (back face) of the paper (step S14).

In steps S10 to S14, when the job of double-face mode is performed, the control section 250A of the first image forming apparatus performs the image forming of the odd-numbered pages on one face of the paper based on the job data and the compressed image data stored in the RAM and the compression memory, and the control section 450A of the second image forming apparatus performs the image forming of the even-numbered pages on the other face of the paper based on the job data and the compressed image data stored in the RAM and the compression memory.

When the job of a one-face mode is performed, for example, the control section 250A of the first image forming apparatus performs image forming on one face of the paper based on the job data and the compressed image data stored in the RAM and the compression memory and the control section 450A of the second image forming apparatus passes the paper on which the image is formed on one face by the first image forming apparatus through a bypass path which does not pass the fixing unit and discharges the paper.

After step S13, the control section 250A of the first image forming apparatus refers to the job data and judges whether or not the writing of all copies is complete (step S15). When the writing of all copies is complete (step S15; YES), the control section 250A of the first image forming apparatus ends the processing.

When the writing of all copies is not complete (step S15; NO), the control section 250A of the first image forming apparatus judges whether or not an instruction of setting change of the job is input from the operation/display section displaying the job setting change screen or the external device 2 connected through the controller 24 (step S16).

A case in which step S15; NO includes, when the writing of the set number of copies set in the job data is not complete, when the performing of the job which is performed with the condition that the change of the setting information of the job is performed (proof output) is complete, when a trial performing which performs at least a portion of the job before the actual performing of the job is complete, and the like.

FIG. 8 shows an example of a job setting changing screen.

As shown in FIG. 8, the job setting changing screen G1 is provided with a job ticket editing area E11, a page base ticket editing area E12, etc. The operation/display section 22 which displays the job setting changing screen G1 functions as a setting changing section on which the change instruction data of the job is input.

The job ticket editing area E11 is provided with various buttons to receive setting change of the job information, and for example, a color balance button B11a, gloss mode button B11b, etc. are provided. The page base ticket editing area E12 is provided with various buttons to receive setting change of page information, and for example, an image screen button B12a, a resolution button B12b, a color button B12c, etc. are provided.

When the setting change instruction of the job is not input (step S16; NO), the control section 250A of the first image forming apparatus returns the processing to the processing of step S10.

When the setting change instruction of the job is input (step S16; YES), the control section 250A of the first image forming apparatus transmits a setting change notification indicating there is an instruction to change the setting of the job to the second image forming apparatus through the communication section 27 (step S16), performs the setting changing processing (step S18) and returns the processing to the processing of step S10.

After step S14, the control section 450A of the second image forming apparatus refers to the job data and determines whether or not the writing of all copies is complete (step S19). When the writing of all copies is complete (step S19; YES), the control section 450A of the second image forming apparatus ends the processing.

When the writing of all copies is not complete (step S19; NO), the control section 450A of the second image forming apparatus judges whether or not the setting change notification is received from the first image forming apparatus through the communication section 47 (step S20). When the setting change notification is not received (step S20; NO), the control section 450A of the second image forming apparatus returns the processing to the processing of step S11.

When the setting change notification is received (step S20; YES), the control section 450A of the second image forming apparatus performs the setting changing processing (step S21) and returns the processing to the processing of step S11.

Next, the setting changing processing performed by the first image forming apparatus and the second image forming apparatus in steps S18 and S21 is described with reference to FIG. 7.

In step S16, when the instruction to change the setting is input on the operation/display section displaying the job setting changing screen, the control section 250A of the first image forming apparatus obtains the change instruction data of the job based on the operation signal of the operation/display section displaying the job setting changing screen. In step S16, when the instruction of setting change is input from the external device 2 connected through the controller 24, the controller control section 241A of the first image forming apparatus obtains change instruction data (for example changed print setting data) of the job according to an instruction of the setting change (step S31).

After step S31, in the first image forming apparatus, it is judged whether or not it is necessary to perform RIP processing again on the image data of the job to regenerate the image data of the job based on the change instruction data (step S32). When the change instruction data is input on the operation/display section displaying the job setting changing screen, the control section 250A of the first image forming apparatus performs the processing of step S32 and when the change instruction data is input from the external device 2 connected through the controller 24, the controller control section 241A performs the processing of step S32.

When the processing of step S32 is performed by the control section 250A of the first image forming apparatus and there is no need to perform RIP processing on the image data of the job again to generate the image data of the job (step S32; NO), the control section 250A of the first image forming apparatus rewrites the job data stored in the RAM 252 and the HDD 26 based on the change instruction data, transmits the change instruction data to the second image forming apparatus through the communication section 27 (step S33), ends the processing, and returns the processing to the processing of step S10.

When the processing of step S32 is performed by the controller control section 241A and there is no need to perform RIP processing on the image data of the job again to generate the image data of the job (step S32; NO), the controller control section 241A rewrites the print setting data stored in the controller storage section 242 based on the change instruction data and transmits the change instruction data to the control section 250A of the first image forming apparatus. The control section 250A of the first image forming apparatus rewrites the job data stored in the RAM 252 and the HDD 26 based on the change instruction data received from the controller 24, transmits the change instruction data to the second image forming apparatus through the communication section 27 (step S33), ends the processing and returns the processing to the processing of step S10.

The control section 450A of the second image forming apparatus judges whether or not the change instruction data is received through the communication section 47 (step S34), and when the change instruction data is received (step S34; YES), the control section 450A of the second image forming apparatus changes the job data stored in the RAM 452 and the HDD 46 based on the change instruction data, rewrites the job data to the changed job data and stores the data (step S35), ends the processing, and returns the processing to the processing of step S11.

When the processing of step S32 is performed by the control section 250A of the first image forming apparatus and there is a need to perform RIP processing again on the image data of the job to generate the image data of the job (step S32; YES), the control section 250A of the first image forming apparatus transmits the change instruction data to the controller control section 241A. The controller control section 241A changes and rewrites the print setting data stored in the controller storage section 242 based on the received change instruction data. Then, the controller control section 241A expands the print data stored in the controller storage section 242 again according to the changed print setting data, performs RIP processing to regenerate the image data (RIP processing again), overwrites the regenerated image data in the controller storage section 242 and stores the data (step S36).

When the processing of step S32 is performed by the controller control section 241A and there is a need to perform RIP processing on the image data of the job again to generate the image data of the job (step S32; YES), the controller control section 241A changes and rewrites the print setting data stored in the controller storage section 242 based on the change instruction data. The controller control section 241A expands the print data stored in the controller storage section 242 again according to the changed print setting data, performs RIP processing to regenerate image data (RIP processing again), overwrites the regenerated image data in the controller storage section 242 and stores the data (step S36).

The controller control section 241A transmits the regenerated image data and the changed print setting data to the control section 250A through the DRAM control IC 255 of the first image forming apparatus by using the DRAM control IC 243.

Examples of needing to perform RIP processing on the image data of the job again to generate the image data of the job are, for example, change of black and white image/color image, change of paper, change of density or color, change of calibration or γ correction of the controller 24, and the like.

Specifically, needing to perform RIP processing on the image data of the job again to generate the image data of the job is, for example, on the job setting screen G1 shown in FIG. 8, when the color balance button B11a is pressed and the color balance is changed, when the gloss mode button B11b is pressed and the ON/OFF of the gloss mode is changed, when the image screen button B12a is pressed and the ON/OFF of the image screen is changed, when the resolution button B12b is pressed and the resolution is changed, when the color button B12c is pressed and printing is changed from full color to black and white, and the like.

When the regenerated image data and the changed print setting data are received from the controller 24, the control section 250A of the first image forming apparatus allows the compression IC 254 to perform the compression processing on the received image data and generates the compressed image data. Then, the generated compressed image data is stored in the compression memory 256a (step S37).

The control section 250A of the first image forming apparatus regenerates the job data based on the changed print setting data and the compressed image data, and rewrites the job data stored in the RAM 252 to the regenerated job data and stores the data (step S38).

When the job including the regenerated job data and the compressed image data is a stored job, the control section 250A of the first image forming apparatus rewrites the job data and the compressed image data stored in the HDD 26 to the regenerated job data and the compressed image data and stores the data (step S39).

Then, the control section 250A of the first image forming apparatus transmits the regenerated job data and the compressed image data to the second image forming apparatus through the communication section 27 (step S40), the processing ends and the processing returns to the processing of step S10.

When the change instruction data is not received (step S34; NO) and the job data and the compressed image data are received through the communication section 47, the control section 450A of the second image forming apparatus overwrites and stores the job data in the RAM 452 and overwrites and stores the compressed image data in the compression memory 456a (step S41).

When the job including the job data and the compressed image data is a stored job, the control section 450A of the second image forming apparatus overwrites and stores the job data and the compressed image data in the HDD 46 (step S42), ends the processing and returns the processing to the processing of step S11.

Figure 9:
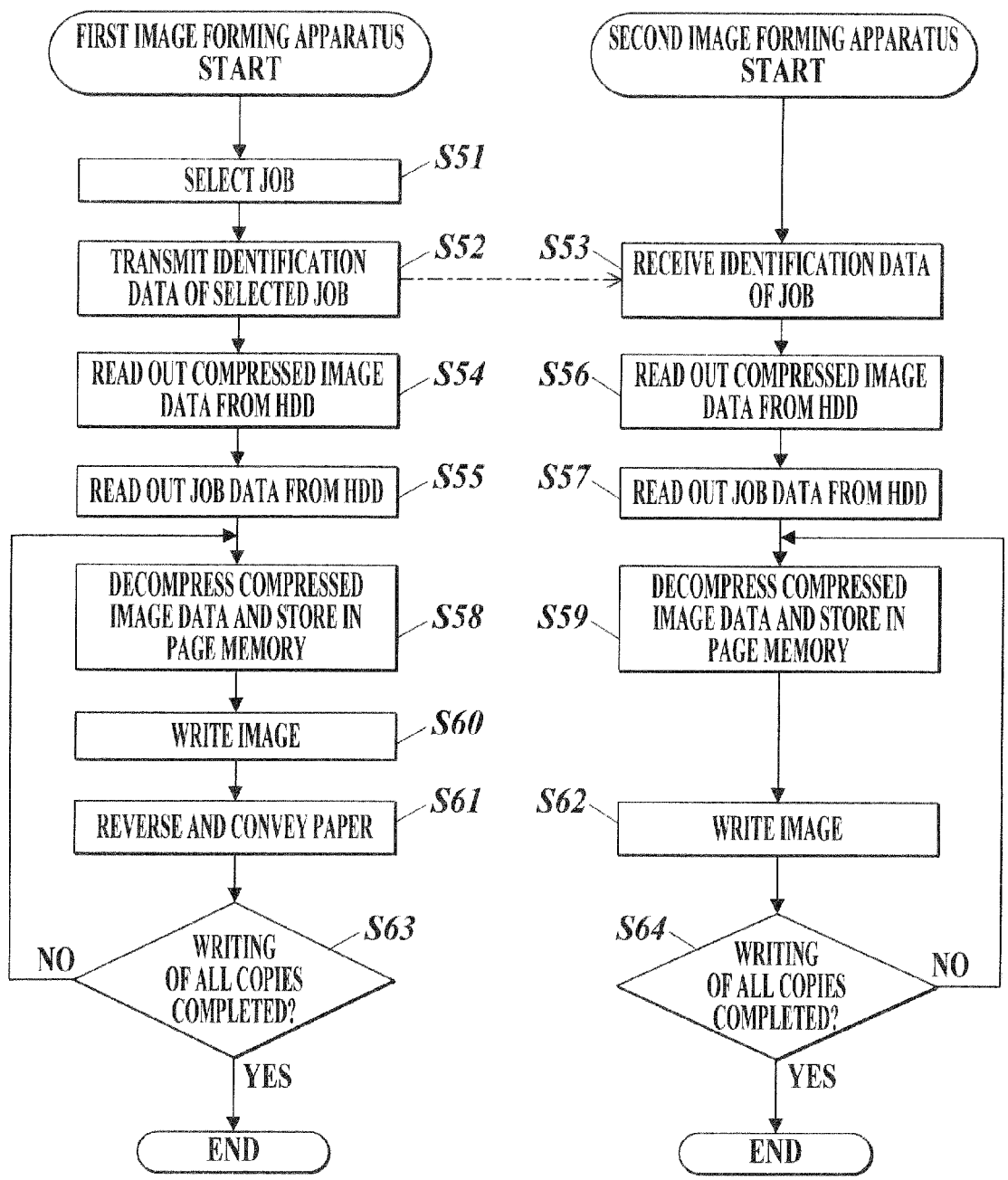
FIG. 9 is a flowchart showing a reprinting processing of a saved job of embodiment 1.

FIG. 9 shows a flowchart of the reprint processing of the stored job in embodiment 1.

When an operation signal selecting any one of the stored jobs stored in the HDD 26 is input from the operation/display section 22 (step S51), the control section 250A of the first image forming apparatus transmits the identification data (for example, file name, job ID, etc.) of the selected stored job to the second image forming apparatus through the communication section 27 (step S52).

The control section 450A of the second image forming apparatus receives identification data of the stored job through the communication section 47 (step S53).

According to the identification data of the selected stored job, the control section 250A of the first image forming apparatus reads out the compressed image data of the stored job from the HDD 26 to the compression memory 256a (step S54) and reads out the job data of the stored job from the HDD 26 to the RAM 252 (step S55).

According to the identification data of the received stored job, the control section 450A of the second image forming apparatus reads out the compressed image data of the stored job from the HDD 46 to the compression memory 456a (step S56) and reads out the job data of the stored job from the HDD 46 to the RAM 452 (step S57).

The processing of steps S58 to S62 is similar to the processing of step S10 to S14, and therefore the description is omitted.

After step S61, the control section 250A of the first image forming apparatus refers to the job data and judges whether or not the writing of all copies is complete (step S63). When the writing of all copies is not complete (step S63; NO), the control section 250A of the first image forming apparatus returns the processing to the processing of step S58 and when the writing of all copies is complete (step S63; YES), the control section 250A of the first image forming apparatus ends the processing.

After step S62, the control section 450A of the second image forming apparatus refers to the job data and judges whether or not the writing of all copies is complete (step S64). When the writing of all jobs is not complete (step S64; NO), the control section 450A of the second image forming apparatus returns the processing to the processing of step S59 and when the writing of all copies is complete (step S64; YES), the control section 450A of the second image forming apparatus ends the processing.

Figure 10:
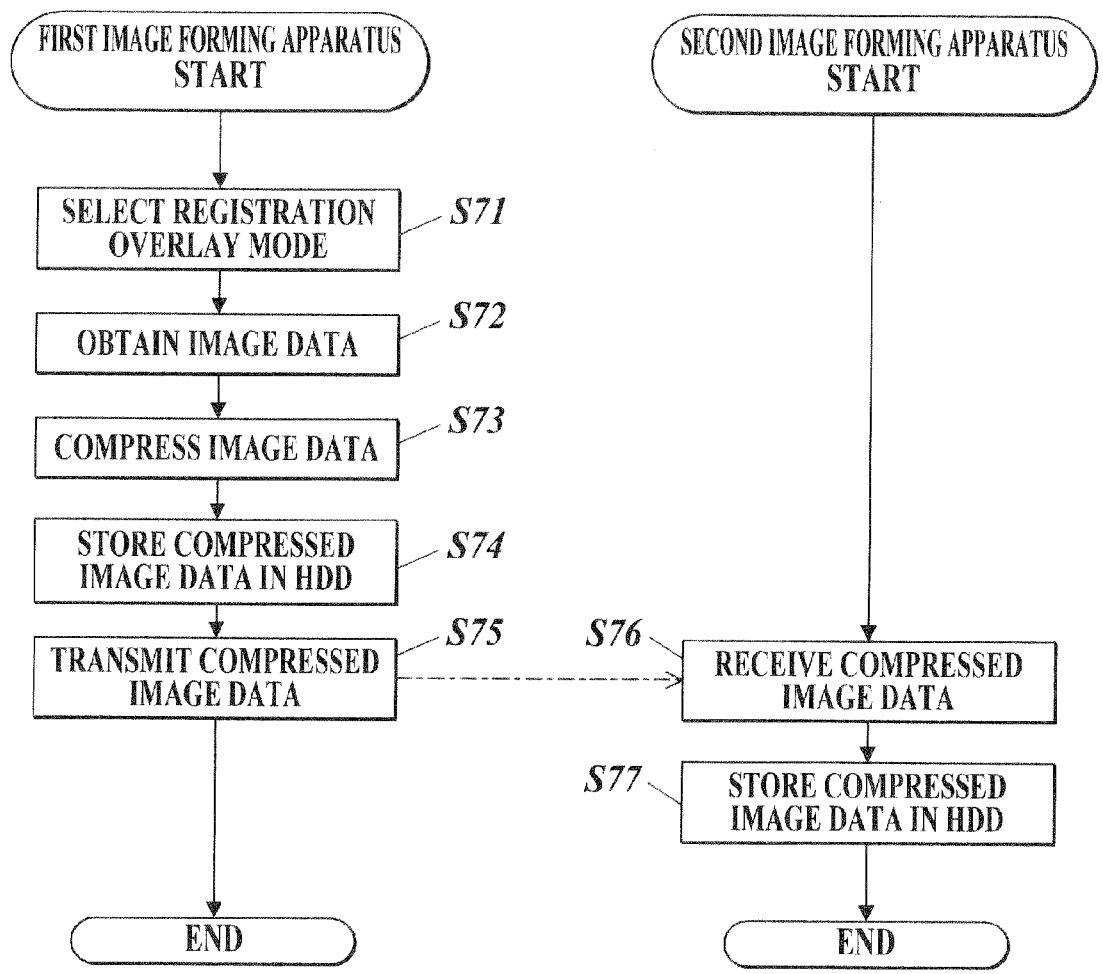
FIG. 10 is a flowchart showing an overlay image registering processing of embodiment 1

FIG. 10 shows a flowchart of the overlay image registering processing of embodiment 1.

When an operation signal to select the registration overlay mode is input from the operation/display section 22 (step S71), the control section 250A of the first image forming apparatus allows the image reading section 21 to read the image of the document to obtain the image data (step S72).

The control section 250A of the first image forming apparatus allows the compression IC 254 to perform compression processing on the obtained image data to generate compressed image data (step S73). Then, the control section 250A stores and registers the generated compressed image data as overlay image data in the HDD 26 (step S74).

The control section 250A of the first image forming apparatus transmits the compressed image data generated in step S73 to the second image forming apparatus through the communication section 27 (step S75).

When the compressed image data is received through the communication section 47 (step S76), the control section 450A of the second image forming apparatus stores and registers the compressed image data as overlay image data in the HDD 46 (step S77).

Figure 11:
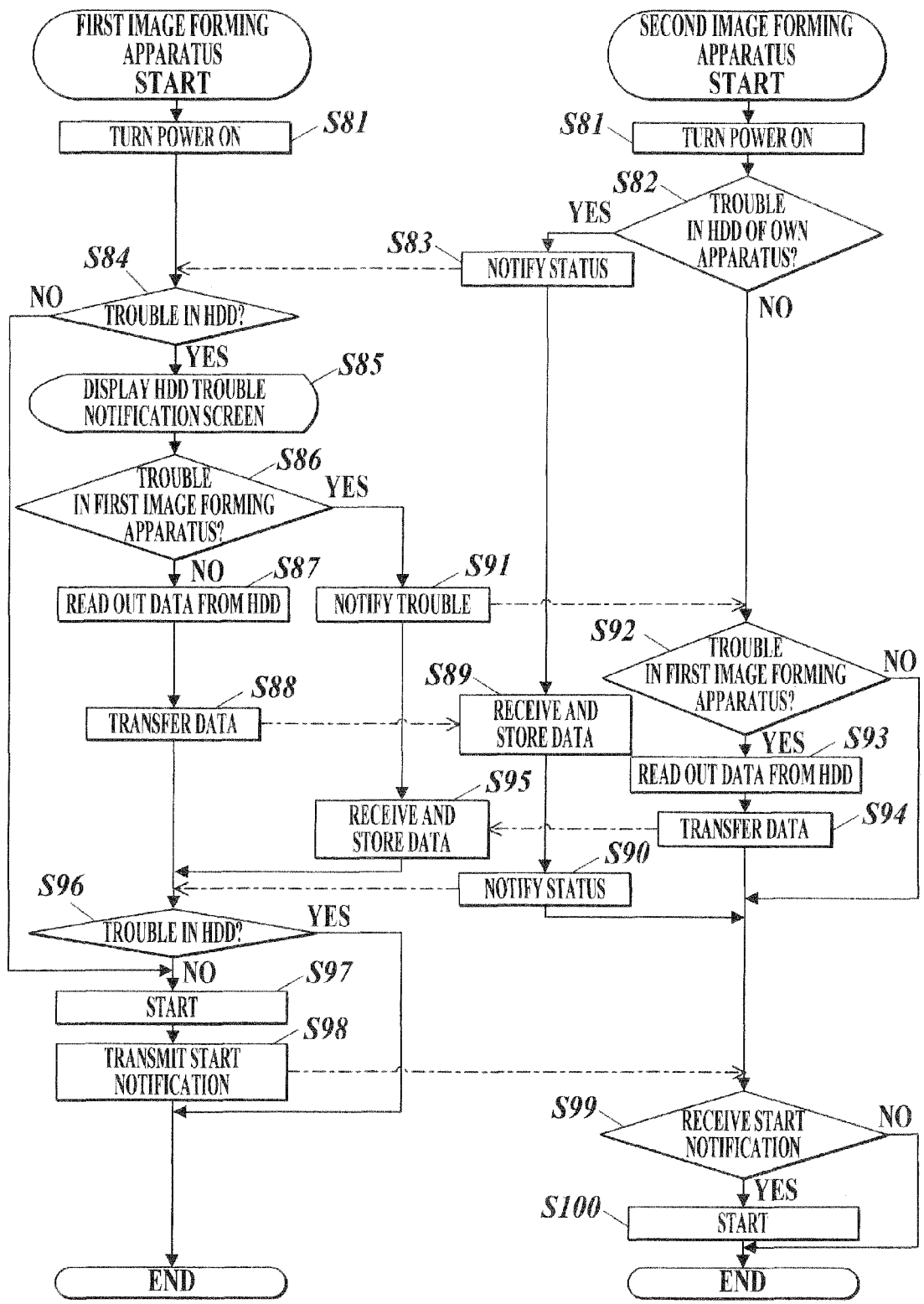
FIG. 11 is a flowchart showing backup processing of embodiment 1.

FIG. 11 shows a flowchart of backup processing of embodiment 1.

When the power of the image forming system 1 is turned on and the power is supplied to its apparatus, the control section 250A of the first image forming apparatus and the control section 450A of the second image forming apparatus check the status of each section of its apparatus (step S81).

The control section 450A of the second image forming apparatus judges whether or not there is trouble in the HDD 46 provided in its apparatus (step S82). Trouble in the HDD in step S82 is for example, lack, corruption, or loss of data stored in the HDD 46, exchange of the HDD due to the corruption of the HDD 46, etc.

When there is no trouble in the HDD 46 provided in its apparatus (step S82; NO), the control section 450A of the second image forming apparatus advances the processing to the processing of step S92.

When there is trouble in the HDD 46 provided in its apparatus (step S82; YES), the control section 450A of the second image forming apparatus transmits a status notification indicating a status (normal/trouble) of the HDD 46 to the first image forming apparatus through the communication section 47 (step S83).

The control section 250A of the first image forming apparatus checks whether or not there is trouble in the HDD 26 provided in its apparatus and also checks whether or not there is trouble in the HDD 46 of the second image forming apparatus with the status notification received from the second image forming apparatus through the communication section 27 and judges whether or not there is trouble in at least one of the HDD 26 of the first image forming apparatus or the HDD 46 of the second image forming apparatus (step S84).

When there is trouble in the HDD 26 of the first image forming apparatus and the HDD 46 of the second image forming apparatus (step S84; NO), the control section 250A of the first image forming apparatus advances the processing to the processing of step S97.

When there is trouble in at least one of the HDD 26 of the first image forming apparatus or the HDD 46 of the second image forming apparatus (step S84; YES), the control section 250A of the first image forming apparatus displays a HDD trouble notification screen on the operation/display section 22 (step S85).

The HDD trouble notification screen displays a message or image which notifies that there is trouble in at least one of the HDD 26 of the first image forming apparatus or the HDD 46 of the second image forming apparatus. A warning sound, etc. can be emitted with the display of the HDD trouble notification screen.

The control section 250A of the first image forming apparatus judges whether or not there is trouble in the HDD 26 of the first image forming apparatus or the HDD 46 of the second image forming apparatus (step S86).

When there is trouble in the HDD 46 of the second image forming apparatus (step S86; NO), the control section 250A of the first image forming apparatus reads out all of the data stored in the HDD 26 of its apparatus (step S87) and transmits a copy of the read out data to the second image forming apparatus through the communication section 27 (step S88).

When the data is received from the first image forming apparatus through the communication section 47, the control section 450A of the second image forming apparatus overwrites the received data on the data of the HDD 46 of its apparatus and stores the data (step S89). Then, the control section 450A of the second image forming apparatus checks again whether or not there is trouble in the HDD 46 provided in its apparatus and transmits the status notification of the HDD 46 to the first image forming apparatus through the communication section 47 (step S90).

When there is trouble in the HDD 26 of the first image forming apparatus (step S86; YES), the control section 250A of the first image forming apparatus transmits a trouble notification indicating there is trouble in the HDD 26 to the second image forming apparatus through the communication section 27 (step S91).

The control section 450A of the second image forming apparatus judges whether or not there is trouble in the HDD 26 of the first image forming apparatus (step S92). In step 92, judgment is made based on whether or not a trouble notification is received from the first image forming apparatus through the communication section 47.

When there is no trouble in the HDD 26 of the first image forming apparatus, in other words, when the trouble notification is not received from the first image forming apparatus (step S92; NO), the control section 450A of the second image forming apparatus advances the processing to the processing of step S99.

When there is trouble in the HDD 26 of the first image forming apparatus, in other words, when the trouble notification is received from the first image forming apparatus (step S92; YES), the control section 450A of the second image forming apparatus reads out all of the data stored in the HDD 46 of its apparatus (step S93), and transmits a copy of the read out data to the first image forming apparatus through the communication section 47 (step S94).

When data is received from the second image forming apparatus through the communication section 27, the control section 250A of the first image forming apparatus overwrites the received data on the data in the HDD 26 of its apparatus and stores the data (step S95).

Then, similar to the processing of step S84, the control section 250A of the first image forming apparatus judges again whether or not there is trouble in at least either one of the HDD 26 of the first image forming apparatus or the HDD 46 of the second image forming apparatus (step S96).

When there is trouble in at least either one of the HDD 26 of the first image forming apparatus or HDD 46 of the second image forming apparatus (step S96; YES), the control section 250A of the first image forming apparatus maintains the state of display of the HDD trouble notification screen on the operation/display section and ends the processing.

When there is no trouble in the HDD 26 of the first image forming apparatus and the HDD 46 of the second image forming apparatus (step S96; NO), or after step S84; NO, the control section 250A of the first image forming apparatus starts each section of the first image forming apparatus (step S97), transmits the start notification to the second image forming apparatus through the communication section 27 (step S98) and ends the processing.

The control section 250A of the second image forming apparatus determines whether or not the start notification is received from the first image forming apparatus through the communication section 47 (step S99). When the start notification is not received (step S99; NO), the control section 250A of the second image forming apparatus ends the processing.

When the start notification is received (step S99; YES), the control section 450A of the second image forming apparatus starts each section of the second image forming apparatus (step S100), and ends the processing.

In the backup processing described using FIG. 11, backup processing when the image forming system 1 is turned ON is described, however, the processing is not limited to this. For example, the processing can be performed when there is trouble in the HDD of either one of the first image forming apparatus or the second image forming apparatus. Also, a backup screen can be displayed by operation of the operation/display screen 22 by the user, and the data of the HDD of one image forming apparatus can be copied and overwritten on the HDD of the other image forming apparatus according to an operation signal from the operation/display section 22 displaying the backup screen. The example using the backup screen is described with reference to FIG. 12.

Figure 12:
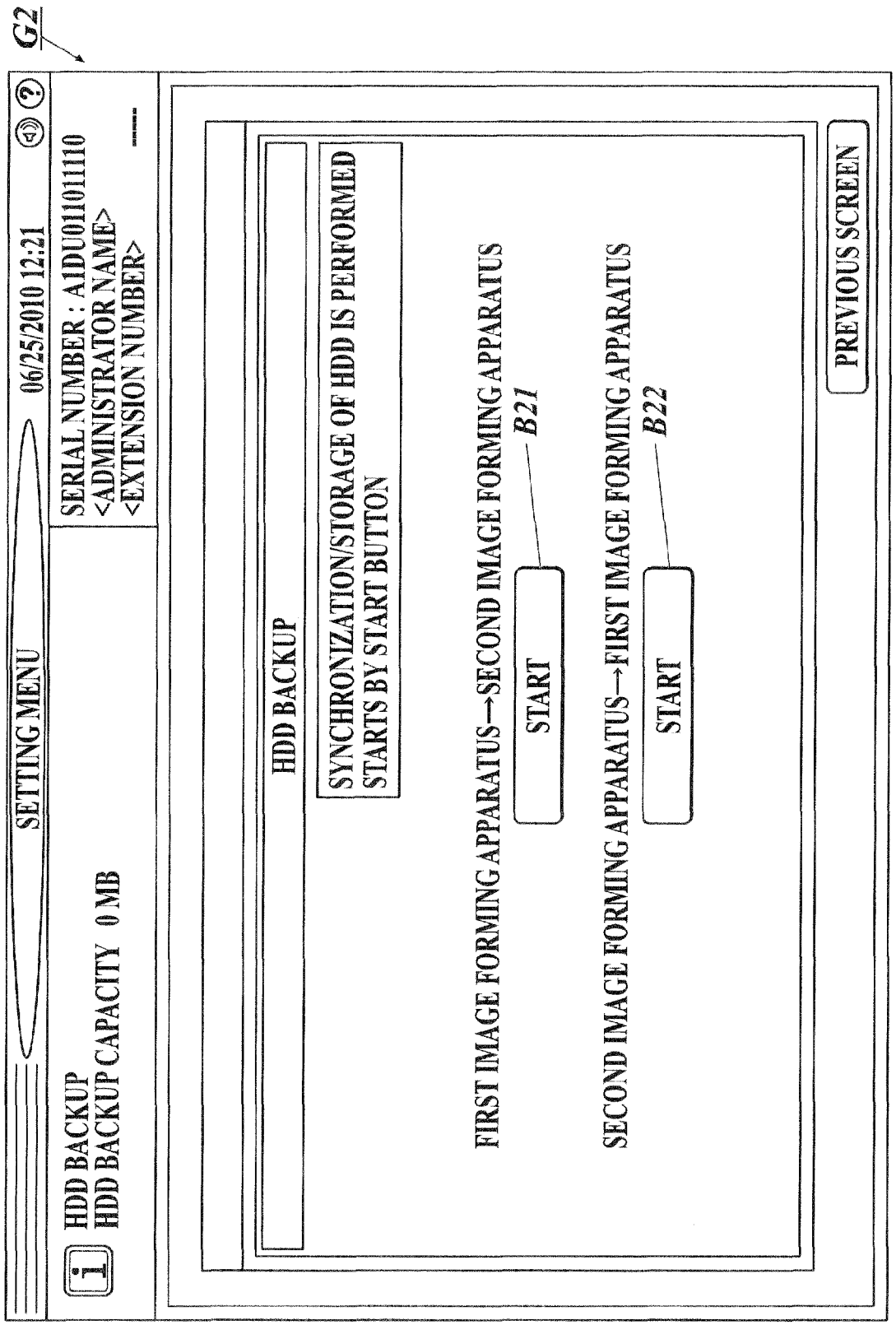
FIG. 12 is a diagram showing an example of a backup screen.

FIG. 12 shows an example of a backup screen.

The backup screen G2 shown in FIG. 12 is provided with a first start button B21 and a second start button B22.

The first start button B21 is a button for instruction of overwriting and storing the data of the HDD of the first image forming apparatus to the HDD of the second image forming apparatus.

The second start button B22 is a button for instruction of overwriting and storing the data of the HDD of the second image forming apparatus to the HDD of the first image forming apparatus.

When the first start button B21 is pressed, the processing after step S86; NO shown in FIG. 11 is performed, and when the second start button B22 is pressed, the processing after S86; YES shown in FIG. 11 is performed. Therefore, the description is omitted.

According to embodiment 1, each of the first image forming apparatus and the second image forming apparatus is provided with a storage section (RAM and compression image memory or HDD) which stores the job data and image data of all pages of the job. Therefore, when the job is performed again, each image forming apparatus can perform the job based on the job data and the image data stored in the storage section. Consequently, print delay due to transfer of data regarding image forming when the job is performed again can be prevented and productivity can be enhanced in the image forming system with a tandem configuration including a plurality of image forming apparatuses.

The control section 250A of the first image forming apparatus can transmit the job data and the image data generated based on the image data generated by the controller control section 241A and the print setting data to the second image forming apparatus. Therefore, the job data and the image data do not have to be generated in the control section 450A of the second image forming apparatus and the control burden of the control section 450A of the second image forming apparatus can be reduced.

When the job is first performed, the job data and the image data of the job can be stored in each storage section of the first image forming apparatus and the second image forming apparatus.

When the job is a stored job, the first image forming apparatus and the second image forming apparatus can hold the job data and the image data of the stored job.

When the change instruction data of the job is input from the operation/display section 22 and the regeneration of image data is not necessary (RIP processing again is not necessary), by transmitting only the change instruction data to the second image forming apparatus, the amount of data transfer regarding the image forming when the job is changed can be reduced. Therefore, print delay due to transfer of data can be reduced and productivity can be enhanced. When the handled image printed on the print face is changed between the first image forming apparatus and the second image forming apparatus, the data does not need to be transferred again, and the productivity can be enhanced.

When change instruction data of the job is input through the controller 24 from the external device and the regeneration of image data is not necessary (RIP processing again is not necessary), by transmitting only the change instruction data to the second image forming apparatus in which the controller 24 is not provided, the amount of data transfer regarding the image forming when the job is changed can be reduced. Therefore, print delay due to transfer of data can be reduced and productivity can be enhanced.

Since the first image forming apparatus and the second image forming apparatus can each hold common overlay image data in the HDD, the transfer time of overlay image data used when performing image combining processing (overlay) using the overlay image data can be saved.

When trouble occurs in the HDD of its apparatus, the data of the HDD of another image forming apparatus can be used as backup data, and the data of the HDD of its apparatus can be easily restored, therefore, the above effects can be ensured.

According to embodiment 1, transfer processing of data does not have to be performed when the stored job is performed, when the job is performed after performing the job for the first time (reprint), when the actual performing of the job is performed after a trial performing which performs at least a portion of the job and when the job is performed after the job performed with the condition that the change of the setting information of the job is performed (proof output). Therefore, the productivity can be enhanced.

According to embodiment 1, when the job performs double face mode, the image of one face of the paper and the image of the other face of the paper can be formed by different image forming apparatuses.

[Embodiment 2]

Embodiment 2 of the present invention is described in detail with reference to the drawings.

First, the configuration is described.

The image forming system of embodiment 2 has the same tandem configuration in a series which includes similar apparatuses as the image forming system of embodiment 1, with the exception of, instead of the first image forming apparatus 20A of the image forming system of embodiment 1 shown in FIG. 1, a first image forming apparatus 20B is used, and instead of the second image forming apparatus 40A, a second image forming apparatus 40B is used. Therefore, description of apparatuses similar to those of embodiment 1 is omitted.

Figure 13:
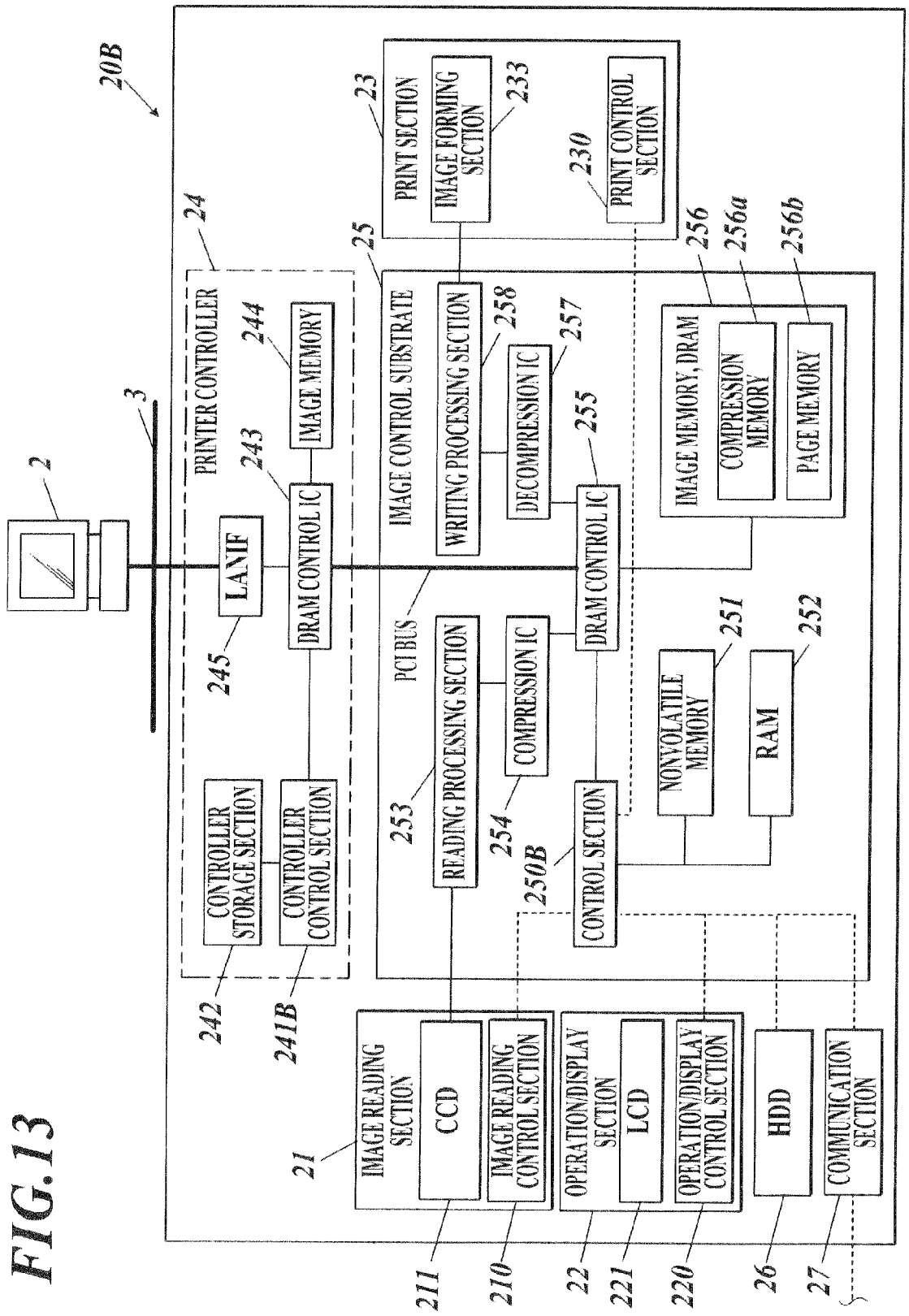
FIG. 13 is a schematic configuration diagram showing a first image forming apparatus of embodiment 2.

FIG. 13 shows a schematic configuration diagram of the first image forming apparatus 20B in embodiment 2.

Similar to the first image forming apparatus 20A of embodiment 1, the first image forming apparatus 20B of embodiment 2 includes an image reading section 21, an operation/display section 22, a print section 23, a controller 24, an image control substrate 25, an HDD 26, a communication section 27, etc. The first image forming apparatus 20B is connected to the external device 2 on the network 3 and the second image forming apparatus 40B through the LANIF 245 of the controller 24 so that data can be transmitted and received between each other.

Below, regarding the first image forming apparatus 20B of embodiment 2, only the portion different from the first image forming apparatus 20A of embodiment 1 is described, and similar reference numerals are applied to the similar portions and the description is omitted.

The controller control section 241B centrally controls the operation of each section of the controller 24 and as a transmitting and receiving section, stores print data and print setting data input from the external device 2 through the LANIF 245 to the controller storage section 242 included in its apparatus and transmits the print data and the print setting data to the second image forming apparatus 40B through the network 3.

The controller control section 241B expands print data and generates image data of a bit map format.

The control section 250B includes a CPU, etc. The control section 250B reads out a program specified from the system program and various application programs stored in the nonvolatile memory 251 and expands the program in the RAM 252. In coordination with the program expanded in the RAM 252, the control section 250B performs various processing and centrally controls each section of the first image forming apparatus 20B.

The control section 250B performs first print processing, print setting changing processing, reprint processing, overlay image registering processing and backup processing with the second image forming apparatus 40B in coordination with a first print processing program, a print setting changing processing program, a reprint processing program, an overlay image registering processing program and a backup processing program and various pieces of data of the embodiment 2 in the nonvolatile memory 251.

In the first print processing, the print data and the print setting data received through the controller 24 of the external device 2 or the image data input from the image reading section 21 and the setting information set on the operation/display section 22 are transmitted to the second image forming apparatus 40B. In the first print processing, the job data and the compressed image data are generated based on the print data and the print setting data or the image data and the setting information, and in coordination with the second image forming apparatus 40B, the job is performed based on the job data and the compressed image data.

The job and the job data are similar to embodiment 1, and therefore the illustration and description are omitted.

The print setting changing processing is processing performed after the first print processing. In the print setting changing processing, when the change instruction data of the job is input from the controller 24 or the operation/display section 22, the change instruction data is transmitted to the second image forming apparatus 40B. In the print setting changing processing, it is judged whether or not the image data needs to be regenerated based on the change instruction data and according to the judgment result, the image data is regenerated based on the change instruction data and the job data is changed. Then, the job is performed again in coordination with the second image forming apparatus 40B based on the changed job data and the compressed image data.

The reprint processing, overlay image registering processing and backup processing are similar to embodiment 1.

Figure 14:
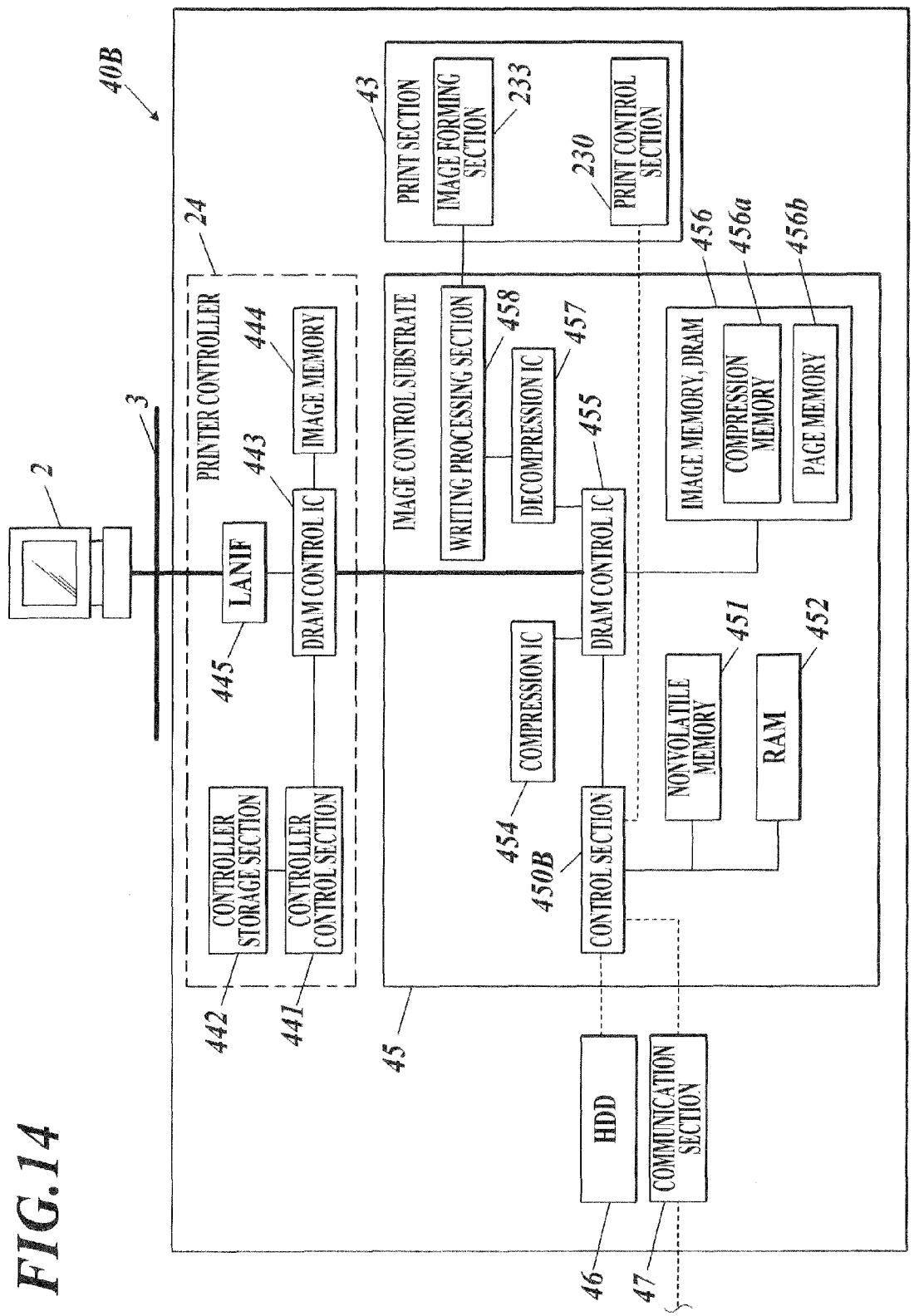
FIG. 14 is a schematic configuration diagram showing a second image forming apparatus of embodiment 2

FIG. 14 shows a schematic configuration diagram of the second image forming apparatus 40B of embodiment 2.

As shown in FIG. 14, the second image forming apparatus 40B includes a print section 43, a controller 44, an image control substrate 45, an HDD 46, a communication section 47, etc. The second image forming apparatus 40B is connected to the external device 2 on the network 3 through the LANIF 445 of the controller 44 and the first image forming apparatus 20B so that data can be transmitted and received between each other.

Below, regarding the second image forming apparatus 40B of embodiment 2, only the portion different from the second image forming apparatus 40A of embodiment 1 is described, and similar reference numerals are applied to the similar portions and the description is omitted.

The controller 44 performs management and control of data input to the image forming system 1 from the external device 2, etc. connected to the network 3. The controller 44 receives data (print data and print setting data) of the print object from various devices connected to the network, and transmits the image data generated by expanding the print data and the print setting data to the image control substrate 45. The controller 44 includes the controller control section 441, the controller storage section 442, the DRAM control IC 443, the image memory 444, the LANIF 445, and the like.

The controller control section 441 centrally controls the operation of each section of the controller 44 and stores print data and print setting data input from the first image forming apparatus 20B through the LANIF 445 to the controller storage section 442 included in its apparatus and expands the print data to generate image data in a bitmap format.

The controller control section 441 can also include the function of storing the print data and print setting data input from the external device 2 through the LANIF 445 to the controller storage section 442 included in its apparatus and transmitting the print data and the print setting data to the first image forming apparatus 20B through the network 3.

The controller storage section 442 includes a nonvolatile memory and stores print data and print setting data.

The DRAM control IC 443, the image memory 444, and the LANIF 445 which functions as a transmitting and receiving section are similar to the DRAM control IC 243, the image memory 244 and the LANIF 245 of the controller 24 included in the first image forming apparatus 20A of embodiment 1, therefore, the description is omitted.

The image control substrate 45 includes a control section 450B, a nonvolatile memory 451, a RAM 452, a compression IC 454, a DRAM control IC 455, an image memory 456, a decompression IC 457, a writing processing section 458 and the like.

The control section 450B includes a CPU, etc. and reads out a program specified from a system program and various application programs stored in the nonvolatile memory 451, and expands the program in the RAM 452. In coordination with the program expanded in the RAM 452, the control section 450B performs various processing and centrally controls each section of the second image forming apparatus 40B.

The control section 450B performs first print processing, print setting changing processing, reprint processing, overlay image registering processing and backup processing with the first image forming apparatus 20B in coordination with a first print processing program, a print setting changing processing program, a reprint processing program, an overlay image registering processing program and a backup processing program and various pieces of data of embodiment 2 in the nonvolatile memory 451.

In the first print processing, the job data and the compressed image data are generated based on the print data and the print setting data received from the first image forming apparatus 20B or the image data and the setting information, and in coordination with the first image forming apparatus 20B, the job is performed based on the job data and the compressed image data.

In the print setting changing processing, when the change instruction data is received from the first image forming apparatus 20B, it is judged whether or not the image data needs to be regenerated based on the change instruction data and according to the judgment result, the image data is regenerated based on the change instruction data and the job data is changed and rewritten. Then, the job is performed again in coordination with the first image forming apparatus 20B based on the changed job data and the compressed image data.

The reprint processing, overlay image registering processing and backup processing are similar to embodiment 1.

Next, the operation of embodiment 2 is described.

Figure 15:
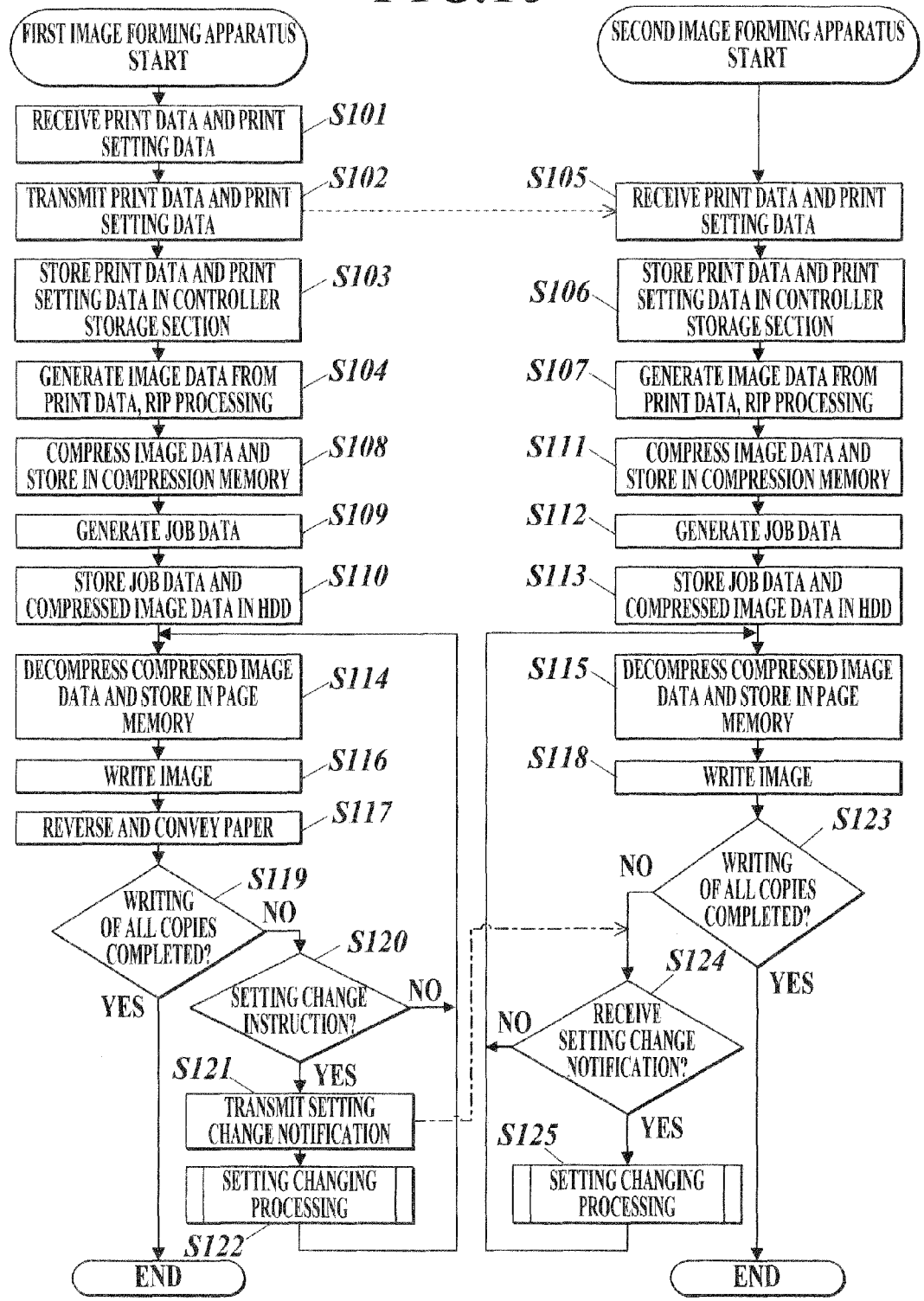
FIG. 15 is a flowchart showing a first print processing and print setting changing processing of embodiment 2.
Figure 16:
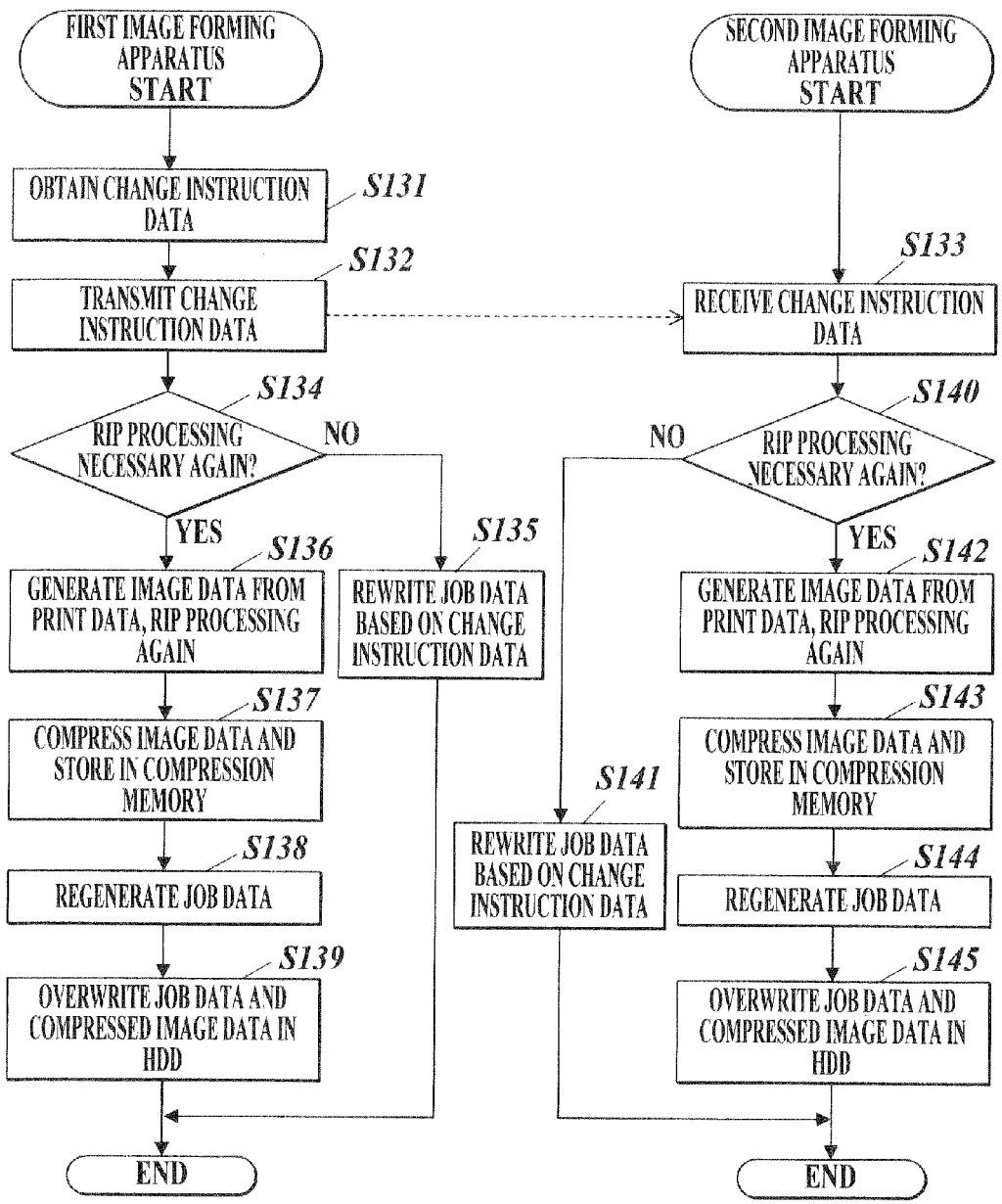
FIG. 16 is a flowchart showing a setting changing processing performed in step S122 and S125.

FIG. 15 and FIG. 16 show flowcharts of the first print processing and the print setting changing processing in embodiment 2.

When the print data and the print setting data are received from the external device 2 connected through the network 3 with the LANIF 245 (step S101), the controller control section 241B of the first image forming apparatus transmits the received print data and print setting data to the second image forming apparatus 40B through the LANIF 245 (step S102).

Steps S103 and S104 performed by the controller control section 241B of the first image forming apparatus are similar to steps S2 and S3 performed by the controller control section 241A of the first image forming apparatus of embodiment 1, and therefore the description is omitted.

The controller control section 441 of the second image forming apparatus receives the print data and the print setting data from the first image forming apparatus 20B connected through the network 3 with the LANIF 445 (step S105).

Similar to the controller control section 241B of the first image forming apparatus, the controller control section 441 of the second image forming apparatus stores the received print data and print setting data in the controller storage section 442 (step S106), and also expands the print data, performs RIP processing and generates image data (step S107).

Then, the controller control section 441 uses the DRAM IC 443 to transmit image data and print setting data to the control section 450B through the DRAM control IC 455 of the second image forming apparatus.

When the image data of the analog signal is obtained by the image reading section 21, instead of the processing of steps S101 to S107, the image data generated from the image data of the analog signal by the reading processing section 253 and the setting information set on the operation/display section 22 when the image data of the analog signal is obtained are input to the control section 250B of the first image forming apparatus and then the image data and the setting information are transmitted to the second image forming apparatus through the communication section 27.

In this case, the image data generated from the image data of the analog signal corresponds to the image data generated from the print data, and the setting information corresponds to the print setting data.

The processing from S108 and after when the image data and the setting information are input from the image reading section and the operation/display section to the control section 250B is similar to when the image data and the print setting data are input from the controller to each control section 250B and 450B. Therefore, an example where the image data and the print setting data are input from the controller to each control section 250B and 450B is described.

When the image data and the print setting data is received from the controller 24, the control section 250B of the first image forming apparatus performs the processing of steps S108 to S110. Steps S108 to S110 are similar to steps S4 to S6 performed by the control section 250A of the first image forming apparatus of embodiment 1, and therefore the description is omitted.

Similar to the control section 250B of the first image forming apparatus, when the image data and the print setting data are received from the controller 44, the control section 450B of the second image forming apparatus allows the compression IC 454 to perform compression processing on all of the received image data and generates compressed image data. Then, the control section 450B stores the generated compressed image data in the compression memory 456a (step S111).

The control section 450B of the second image forming apparatus generates job data regarding all of the pages of the job based on the print setting data and compressed image data, and stores the generated job data in the RAM 452 (step S112).

Moreover, when the job including the job data and the compressed image data is a stored job, the control section 450B of the second image forming apparatus stores the job data and the compressed image data regarding all pages of the stored job in the HDD 46 (step S113).

The control section 250B of the first image forming apparatus refers to the image list formed based on the job data, reads out the compressed image data of the page (for example, odd-numbered page) of the print face to be printed with its apparatus (first image forming apparatus) from the compression memory 256a, performs decompression processing with the decompression IC 257 and stores the data in the page memory 256b (S114). Similar to the control section 250B of the first image forming apparatus, the control section 450B of the second image forming apparatus refers to the image list formed based on the job data, reads out the compressed image data of the page (for example, even-numbered page) of the print face to be printed with its apparatus (second image forming apparatus) from the compression memory 456a, performs decompression processing with the decompression IC 457, and stores the data in the page memory 456b (step S115).

In steps S114 and S115, the processing when the overlay is set in the job data is similar to embodiment 1, therefore, the description is omitted.

The processing of steps S116 to S125 is similar to the processing of steps S12 to S21 of embodiment 1, therefore the description is omitted.

Next, the setting changing processing performed by the first image forming apparatus and the second image forming apparatus in steps S122 and S125 is described with reference to FIG. 16.

In step S120, when the instruction of setting change is input on the operation/display section displaying the job setting changing screen, the control section 250B of the first image forming apparatus obtains the change instruction data of the job based on the operation signal of the operation/display section displaying the job setting changing screen. In step S120, when the instruction of setting change is input from the external device 2 connected through the controller 24, the controller control section 241B of the first image forming apparatus obtains change instruction data of the job (for example, changed print setting data) based on instruction of the setting change (step S131).

The first image forming apparatus transfers the obtained change instruction data to the second image forming apparatus (step S132). In step S132, when the change instruction data is obtained based on the operation signal of the operation/display section displaying the job setting changing screen, the control section 250B transmits the change instruction data to the second image forming apparatus through the communication section 27. When the change instruction data is obtained based on the print setting data, etc. input from the external device 2, the controller control section 241B transmits the change instruction data to the second image forming apparatus through the LANIF 245.

The second image forming apparatus receives the change instruction data from the first image forming apparatus (step S133). In step S133, the control section 250B receives the change instruction data through the communication section 47 or the controller control section 441 receives the change instruction data through the LANIF 445.

In the first image forming apparatus, after step S132, it is determined whether or not it is necessary to perform RIP processing again to regenerate the image data of the job based on the change instruction data (step S134). When the change instruction data is input on the operation/display section displaying the job setting changing screen, the control section 250B of the first image forming apparatus performs the processing of step S134 and when the change instruction data is input from the external device 2 connected through the controller 24, the controller control section 241B performs the processing of step S134.

When the processing of step S134 is performed by the control section 250B of the first image forming apparatus and there is no need to perform RIP processing on the image data of the job again to generate the image data of the job (step S134; NO), the control section 250B of the first image forming apparatus rewrites the job data stored in the RAM 252 and the HDD 26 based on the change instruction data (step S135), ends the processing, and returns the processing to the processing of step S114.

When the processing of step S134 is performed by the controller control section 241B and there is no need to perform RIP processing on the image data of the job again to generate the image data of the job (step S134; NO), the controller control section 241B rewrites the print setting data stored in the controller storage section 242 based on the change instruction data and transmits the change instruction data to the control section 250B of the first image forming apparatus. Based on the change instruction data received from the controller 24, the control section 250B of the first image forming apparatus changes the job data stored in the RAM 252 and the HDD 26, rewrites and stores the job data to the changed job data (step S135), ends the processing and returns the processing to the processing of step S114.

When the processing of step S134 is performed by the control section 250B of the first image forming apparatus and there is a need to perform the RIP processing on the image data of the job data again to generate the image data of the job (step S134; YES), the control section 250B of the first image forming apparatus transmits the change instruction data to the controller control section 241B. The controller control section 241B changes and rewrites the print setting data stored in the controller control section 242 based on the received change instruction data. Then, the controller control section 241B expands the print data stored in the controller storage section 242 again according to the changed print setting data, performs RIP processing to regenerate the image data (RIP processing again), overwrites the regenerated image data in the controller storage section 242 and stores the data (step S136).

When the processing of step S134 is performed by the controller control section 241B and there is a need to perform the RIP processing on the image data of the job data again to generate the image data of the job (step S134; YES), the controller control section 241B changes and rewrites the print setting data stored in the controller storage section 242 based on the change instruction data. Then, the controller control section 241B expands the print data stored in the controller storage section 242 again according to the changed print setting data, performs RIP processing to regenerate the image data (RIP processing again), overwrites the regenerated image data in the controller storage section 242 and stores the data (step S136).

The controller control section 241B uses the DRAM control IC 243 to transmit the regenerated image data and the changed print setting data to the control section 250B through the DRAM control IC 255 of the first image forming apparatus.

The description regarding when there is a need to perform the RIP processing on the image data of the job data again to regenerate the image data of the job is similar to embodiment 1 and therefore illustration and description are omitted.

When the regenerated image data and the changed print setting data is received from the controller 24, the control section 250B of the first image forming apparatus allows the compression IC 254 to perform compression processing on the received image data and generates compressed image data. Then, the generated compressed image data is stored in the compression memory 256a (step S137).

The control section 250B of the first image forming apparatus generates the job data again based on the changed print setting data and the compressed image data, rewrites the job data stored in the RAM 252 to the regenerated job data and stores the data (step S138).

When the job including the job data and the compressed image data is a stored job, the control section 250B of the first image forming apparatus rewrites the job data and the compressed image data stored in the HDD 26 to the regenerated job data and the compressed image data and stores the data (step S139), ends the processing, and returns the processing to the processing of step S115.

In the second image forming apparatus, after step S133, the processing of steps S140 to S145 is performed. The processing of steps S140 to S145 is similar to steps S134 to S139 in the first image forming apparatus, and the control section 450B of the second image forming apparatus performs the processing of the control section 250B of the first image forming apparatus and the controller control section 441 of the second image forming apparatus performs the processing of the controller control section 241B of the first image forming apparatus, and therefore the description is omitted.

The reprint processing of the stored job, overlay image registering processing and the backup processing in embodiment 2 is similar to that of embodiment 1, and therefore the illustration and description are omitted.

According to embodiment 2, each of the first image forming apparatus and the second image forming apparatus is provided with a storage section (RAM, compression image memory or HDD) which stores the job data and image data of all pages of the job. Therefore, when the job is performed again, each image forming apparatus can perform the job based on the job data and the image data stored in the storage section. Consequently, print delay due to transfer of data regarding image forming when the job is performed again can be prevented and productivity can be enhanced in the image forming system with a tandem configuration including a plurality of image forming apparatuses.

According to embodiment 2, the first image forming apparatus and the second image forming apparatus are each provided with controllers. The controllers which use the transmitting and receiving section to receive print data and print setting data from the external device can transmit the received print data and print setting data to other controllers. Therefore, each controller can hold the print data and the print setting data. Therefore, even if there is a change in the image data of the job, it is not necessary to resend the print data and the print setting data necessary to regenerate the image data of the job.

Moreover, the controller which receives the change instruction data can transmit the change instruction data to the other controller. Therefore, the first image forming apparatus and the second image forming apparatus can each change the job data and the image data of the job based on the change instruction data. Consequently, the amount of transfer of data regarding image forming when the job is changed can be reduced, print delay due to transfer of data can be reduced and productivity can be enhanced.

When the change instruction data of the job is input from the operation/display section 22 and the regeneration of image data is not necessary (RIP processing again is not necessary), by transmitting only the change instruction data to the second image forming apparatus, the amount of data transfer regarding the image forming when the job is changed can be reduced. Therefore, print delay due to transfer of data can be reduced and productivity can be enhanced.

When the job is a stored job, the first image forming apparatus and the second image forming apparatus can hold the job data and the image data of the stored job.

Similar to embodiment 1, since the first image forming apparatus and the second image forming apparatus can each hold common overlay image data in the HDD, the transfer time of overlay image data used when performing image combining processing (overlay) using the overlay image data can be saved.

Similar to embodiment 1, when trouble occurs in the HDD of its apparatus, the data of the HDD of another image forming apparatus can be used as backup data, and the data of the HDD of its apparatus can be easily restored, therefore, the above effects can be ensured.

According to embodiment 2, when the stored job is performed, when the job is performed after performing the job for the first time (reprint), when the actual performing of the job is performed after a trial performing which performs at least a portion of the job and when the job is performed after the job performed with the condition that the change of the setting information of the job is performed (proof output), the transfer delay of data can be reduced and the productivity can be enhanced.

According to embodiment 2, when the job performs double face mode, the image of one face of the paper and the image of the other face of the paper can be formed by different image forming apparatuses.

In the above description, as the computer readable medium including the program of the present invention, an example using the nonvolatile memory 251, 451, etc. is disclosed, however the invention is not limited to this example. As other computer readable medium, a nonvolatile memory such as a flash memory, etc., or a portable recording medium such as a CD-ROM, etc. can be employed. Moreover, as a medium to provide data of the program of the present invention through communication lines, a carrier wave can be employed in the present invention.

The present invention is not limited to the content of the invention as described above, and can be suitably modified without leaving the scope of the present invention.

According to an aspect of the preferred embodiments of the present invention, there is provided an image forming system including a series tandem configuration in which a plurality of image forming apparatuses are linked and the plurality of image forming apparatuses each form an image of a different printing face to perform a job, the system including:

a storage section which is provided in each of the image forming apparatuses and which stores job data and image data regarding all pages of the job; and a control section which is provided in each of the image forming apparatuses, and which reads out job data and image data of an already performed job from the storage section, and performs control of performing the job again based on the read out job data and image data.

Preferably, the image forming system further includes a setting changing section on which change instruction data of the job is input, wherein the control section of any one image forming apparatus among the plurality of image forming apparatuses judges whether or not it is necessary to regenerate the image data based on the change instruction data input on the setting changing section and when there is no need to regenerate the image data, the change instruction data is transmitted to another image forming apparatus; and the control section of the image forming apparatus which receives the change instruction data changes and rewrites job data stored in the storage section included in its apparatus based on the change instruction data.

Preferably, the image forming system further includes a controller including:

a receiving section which receives print data and print setting data;

a controller control section which expands the print data and generates image data; and a controller storage section which stores the print data and the print setting data received by the receiving section, wherein the control section of any one image forming apparatus among the plurality of image forming apparatuses generates job data based on the image data generated by the controller control section and the print setting data, and transmits the job data and the image data to another image forming apparatus.

Preferably, in the image forming system, the controller is provided in any one of the plurality of image forming apparatuses;

the receiving section receives the change instruction data of the job;

the controller control section judges whether or not regeneration of the image data is necessary by the change instruction data received by the receiving section; and the control section of the image forming apparatus provided with the controller transmits only the change instruction data to the image forming apparatus not provided with the controller when the controller control section judges it is not necessary to regenerate the image data.

Preferably, in the image forming system, the control section of any one image forming apparatus among the plurality of image forming apparatuses transmit the job data and the image data of the job to another image forming apparatus when the job is first performed; and the control section provided in each of the other image forming apparatus stores the received job data and the image data in the storage section provided in its apparatus.

Preferably, the image forming system further includes a controller provided in each of the plurality of image forming apparatuses, the controller including:

a transmitting and receiving section which transmits and receives print data and print setting data;

a controller control section which expands the print data and generates image data; and a controller storage section which stores the print data and the print setting data received by the transmitting and receiving section, wherein the controller control section transmits the received print data and the print setting data to the other controller when the print data and the print setting data are received from an external device with the transmitting and receiving section.

Preferably, in the image forming system, the transmitting and receiving section receives change instruction data of the job; and the controller control section of the controller which receives the change instruction data with the receiving section transmits the change instruction data to another controller.

Preferably, in the image forming system, the storage section provided in each image forming apparatus includes a rewritable nonvolatile memory;

the control section provided in each image forming apparatus stores the job data and the image data of the job in the nonvolatile memory included in the storage section of its apparatus when the job is a stored job set with a storage instruction to store in the nonvolatile memory.

Preferably, the image forming system further includes an image reading section which reads an image from a document and generates the image data, wherein the control section of any one image forming apparatus among the plurality of image forming apparatuses which obtains the image data generated by the image reading section stores the image data generated by the image reading section in the nonvolatile memory included in the storage section of its apparatus and transmits the image data to another image forming apparatus; and the control section provided in each of the other image forming apparatus stores the received image data in the nonvolatile memory included in the storage section of its apparatus.

Preferably, in the image forming system, the control section provided in each image forming apparatus rewrites the data stored in the nonvolatile memory to data stored in the nonvolatile memory included in the storage section of another image forming apparatus when trouble occurs in the nonvolatile memory included in the storage section of its apparatus.

Preferably, in the image forming system to perform the job again is to perform the job stored in the nonvolatile memory.

Preferably, in the image forming system, to perform the job again is to perform the job performed after first performing the job, to perform actual performing of the job performed after a test performing which performs at least a portion of the job, or to perform the job performed after performing of a job which is performed with a condition that a change in setting information of the job is performed.

Preferably, in the image forming system, when a job in which double face mode to form an image on both faces of paper is set is performed, the control section of any one image forming apparatus among the plurality of image forming apparatuses performs control of image forming of a page in which page number is odd on one face of the paper based on the job data and the image data stored in the storage section provided in its apparatus; and any one of the control sections other than the control section which performs control of image forming of the odd numbered page performs control of image forming of a page in which page number is even on the other face of the paper based on the job data and the image data stored in the storage section provided in its apparatus.

According to the present invention, print delay due to transfer of data regarding image forming can be prevented and productivity can be enhanced in an image forming system with a tandem configuration including a plurality of image forming apparatuses Although various exemplary embodiments have been shown and described, the invention is not limited to the embodiments shown. Therefore, the scope of the invention is intended to be limited solely by the scope of the claims that follow and not by the above explanation, and it is intended that the present invention covers modifications and variations that come within the scope of the appended claims and their equivalents.

The present application is based on Japanese Patent Application No. 2010-200472 filed on Sep. 8, 2010 to the Japanese Patent Office, which shall be a basis for correcting mistranslations.

What is claimed is:

1. An image forming system having a series tandem configuration, the image forming system comprising:

a plurality of image forming apparatuses which are linked to each other, each of the plurality of image forming apparatuses forming an image on a different printing face to perform a job; and a setting changing section on which change instruction data of the job is input;

wherein each of the plurality of image forming apparatuses comprises:

a storage section which stores job data and image data regarding all pages of the job; and a control section which reads out job data and image data of an already performed job from the storage section, and performs control of performing the job again based on the read out job data and image data;

wherein the control section of any one image forming apparatus among the plurality of image forming apparatuses judges whether or not it is necessary to regenerate the image data based on the change instruction data input on the setting changing section and, when there is no need to regenerate the image data, the change instruction data is transmitted to another image forming apparatus; and wherein the control section of the image forming apparatus which receives the change instruction data changes and rewrites job data stored in the storage section of its respective image forming apparatus based on the change instruction data.

2. The image forming system of claim 1, wherein the storage section provided in each image forming apparatus includes a rewritable nonvolatile memory; and wherein the control section provided in each image forming apparatus stores the job data and the image data of the job in the nonvolatile memory included in the storage section of its respective image forming apparatus when the job is a stored job set with a storage instruction to store in the nonvolatile memory.

3. The image forming system of claim 2, further comprising an image reading section which reads an image from a document and generates the image data, wherein the control section of any one image forming apparatus among the plurality of image forming apparatuses which obtains the image data generated by the image reading section stores the image data generated by the image reading section in the nonvolatile memory included in the storage section of its respective image forming apparatus and transmits the image data to another image forming apparatus; and wherein the control section provided in the another image forming apparatus stores the received image data in the nonvolatile memory included in the storage section of its respective image forming apparatus.

4. The image forming system of claim 2, wherein the control section provided in each image forming apparatus rewrites the data stored in the nonvolatile memory included in the storage section of its respective image forming apparatus to data stored in the nonvolatile memory included in the storage section of another image forming apparatus when trouble occurs in the nonvolatile memory included in the storage section of its respective image forming apparatus.

5. The image forming system of claim 2, wherein performing the job again comprises performing the job stored in the nonvolatile memory.

6. The image forming system of claim 1, wherein performing the job again comprises one of (i) performing the job again after first performing the job, (ii) performing actual performing of the job after a test performing which performs at least a portion of the job, and (iii) performing the job after performing a job which is performed under a condition in which setting information of the job is changed.

7. The image forming system of claim 1, wherein:

when a job is performed in which a double face mode to form an image on both faces of paper is set, the control section of any one image forming apparatus among the plurality of image forming apparatuses performs control of image forming of a page having an odd page number on one face of the paper based on the job data and the image data stored in the storage section provided in its respective image forming apparatus; and any one of the control sections other than the control section which performs the control of the image forming of the page having the odd page number performs control of image forming of a page having an even page number on the other face of the paper based on the job data and the image data stored in the storage section provided in its respective image forming apparatus.

8. An image forming system having a series tandem configuration, the image forming system comprising:

a plurality of image forming apparatuses which are linked to each other, each of the plurality of image forming apparatuses forming an image on a different printing face to perform a job; and a controller;

wherein each of the plurality of image forming apparatuses comprises:

a storage section which stores job data and image data regarding all pages of the job; and a control section which reads out job data and image data of an already performed job from the storage section, and performs control of performing the job again based on the read out job data and image data;

wherein the controller comprises:

a receiving section which receives print data and print setting data;

a controller control section which expands the print data and generates image data; and a controller storage section which stores the print data and the print setting data received by the receiving section; and wherein:

the control section of any one image forming apparatus among the plurality of image forming apparatuses generates job data based on the image data generated by the controller control section and the print setting data, and transmits the job data and the image data to another image forming apparatus;

the controller is provided in any one of the plurality of image forming apparatuses;

the receiving section receives the change instruction data of the job;

the controller control section judges whether or not regeneration of the image data is necessary based on the change instruction data received by the receiving section; and the control section of the image forming apparatus provided with the controller transmits only the change instruction data to an image forming apparatus not provided with the controller when the controller control section judges it is not necessary to regenerate the image data.

9. The image forming system of claim 1, wherein:

the control section of any one image forming apparatus among the plurality of image forming apparatuses transmits the job data and the image data of the job to another image forming apparatus when the job is first performed; and the control section provided in the another image forming apparatus stores the received job data and the image data in the storage section provided in its respective image forming apparatus.

10. The image forming system of claim 1, further comprising:

a controller provided in each of the plurality of image forming apparatuses, the controller comprising:

a transmitting and receiving section which transmits and receives print data and print setting data;

a controller control section which expands the print data and generates image data; and a controller storage section which stores the print data and the print setting data received by the transmitting and receiving section, wherein the controller control section transmits the received print data and the print setting data to another controller when the print data and the print setting data are received from an external device by the transmitting and receiving section.

11. The image forming system of claim 10, wherein the transmitting and receiving section receives the change instruction data of the job; and wherein the controller control section of the controller which receives the change instruction data with its respective transmitting and receiving section transmits the change instruction data to another controller.

* * * * *